(12) United States Patent
Larsen et al.

(10) Patent No.: US 7,321,433 B2
(45) Date of Patent: Jan. 22, 2008

(54) METHOD AND APPARATUS FOR OPTICALLY MEASURING THE TOPOGRAPHY OF NEARLY PLANAR PERIODIC STRUCTURES

(75) Inventors: Niels Agersnap Larsen, Lyngby (DK); Poul-Erik Hansen, Farum (DK)

(73) Assignee: Dansk Fundamental Metrologi A/S, Lyngby (DK)

( * ) Notice: Subject to any disclaimer, the term of this patent is extended or adjusted under 35 U.S.C. 154(b) by 261 days.

(21) Appl. No.: 10/521,009

(22) PCT Filed: Jul. 1, 2003

(86) PCT No.: PCT/DK03/00457

§ 371 (c)(1), (2), (4) Date: Oct. 31, 2005

(87) PCT Pub. No.: WO2004/008069

PCT Pub. Date: Jan. 22, 2004

(65) Prior Publication Data

US 2006/0176493 A1    Aug. 10, 2006

Related U.S. Application Data

(60) Provisional application No. 60/395,324, filed on Jul. 12, 2002.

(51) Int. Cl.
*G01B 11/14* (2006.01)
*G01B 11/24* (2006.01)
*G01B 11/06* (2006.01)

(52) U.S. Cl. .................. 356/601; 356/625; 356/394; 356/369; 250/372; 250/339.02; 702/189; 702/179

(58) Field of Classification Search ........ 356/601–625, 356/367–369, 394, 448; 250/225, 339.02, 250/372, 559.04; 702/189, 179
See application file for complete search history.

(56) References Cited

U.S. PATENT DOCUMENTS 5,164,790 A    11/1992   McNeil et al.
(Continued)

FOREIGN PATENT DOCUMENTS

WO    WO 99/45340    9/1999
(Continued)

OTHER PUBLICATIONS

International Search Report of PCT/DK03/00457, Jan. 7, 2004.
Ch. Zanke et al., "Fine-tuned profile simulation of holographically exposed photoresist gratings", Optics Communications, 154 (1998), pp. 109-118.

*Primary Examiner*—Sang H. Nguyen
(74) *Attorney, Agent, or Firm*—Foley & Lardner LLP

(57) ABSTRACT

The present invention discloses a non-destructive method and apparatus for measuring the 3D topography of a sample having periodic microstructure deposited onto the surface, or deposited onto a film, or buried into the film or sample. In particular, the present invention relates to an optical system and method utilizing polarized light beam, diffracted from the repeated structure, to measure its spatial geometry giving parameters such as profile height, profile widths, sidewall angles, and arbitrary profile shape. The optical system employs a broadband or semi-monochromatic light source to produce a light beam that is polarized and focused onto the periodic structure being measured. The focused beam consists of a whole range of illumination angles that is provided to the structure simultaneously. Transmitted or reflected diffracted light generated by the interaction of the light with the periodic structure is collected by an imaging detector system. The detector records the diffraction light irradiance resolved into illumination angles, diffraction orders and wavelength. The data is applied to determine the geometrical profile of the periodic structure using a reconstruction algorithm that is based on comparisons between measured diffraction data and modeled diffraction irradiance of a profile model using Maxwell's equations. The reconstruction of the profile is performed by iterative adjustments of a profile seed model until the modeled diffraction irradiance matches the measured data within a predefined convergence tolerance.

48 Claims, 17 Drawing Sheets

U.S. PATENT DOCUMENTS

| | | |
|---|---|---|
| 5,189,490 A | 2/1993 | Shetty et al. |
| 5,674,652 A * | 10/1997 | Bishop et al. ................ 430/30 |
| 5,867,276 A * | 2/1999 | McNeil et al. .............. 356/445 |
| 5,963,329 A | 10/1999 | Conrad et al. |
| 6,483,580 B1 * | 11/2002 | Xu et al. .................... 356/300 |
| 6,657,736 B1 * | 12/2003 | Finarov et al. ............. 356/625 |
| 6,768,967 B2 * | 7/2004 | Johnson et al. ............. 702/179 |
| 7,023,549 B2 * | 4/2006 | Shchegrov et al. ......... 356/369 |
| 7,099,005 B1 * | 8/2006 | Fabrikant et al. ........... 356/369 |
| 7,115,858 B1 * | 10/2006 | Holden et al. .............. 250/225 |
| 2002/0051564 A1 | 5/2002 | Benesch et al. |

FOREIGN PATENT DOCUMENTS

| | | |
|---|---|---|
| WO | WO 01/40775 | 6/2001 |
| WO | WO 01/55669 | 8/2001 |
| WO | WO 02/14840 | 2/2002 |

* cited by examiner

| Layer | Height | Width | | Offset | | Material |
|---|---|---|---|---|---|---|
| q | $h_q$ (nm) | $w_{qx}$ (nm) | $w_{qy}$ (nm) | $x_q$ (nm) | $y_q$ (nm) | |
| Substrate | infinity | n/a | n/a | n/a | n/a | InP |
| 1 | 290,00 | 180,00 | 125,00 | 0,00 | 0,00 | Photo resist |
| Superstrate | infinity | n/a | n/a | n/a | n/a | Vacuum |

Periodicity: $\Lambda_x$ = 300 nm  $\Lambda_y$ = 250 nm

| Layer | Height | Width | | Offset | | Material |
|---|---|---|---|---|---|---|
| q | $h_q$ (nm) | $w_{qx}$ (nm) | $w_{qy}$ (nm) | $x_q$ (nm) | $y_q$ (nm) | |
| Substrate | infinity | n/a | n/a | n/a | n/a | InP |
| 1 | 200,00 | 180,00 | 125,00 | 0,00 | 0,00 | Photo resist |
| 2 | 30,00 | 179,79 | 122,82 | 0,00 | 0,00 | Photo resist |
| 3 | 30,00 | 176,61 | 120,25 | 0,00 | 0,00 | Photo resist |
| 4 | 30,00 | 167,01 | 117,65 | 0,00 | 0,00 | Photo resist |
| superstrate | infinity | n/a | n/a | n/a | n/a | Vacuum |

Periodicity:   $\Lambda_x = 300$ nm   $\Lambda_y = 250$ nm

METHOD AND APPARATUS FOR OPTICALLY MEASURING THE TOPOGRAPHY OF NEARLY PLANAR PERIODIC STRUCTURES

FIELD OF THE INVENTION

The present invention relates to a method and apparatus for optically measuring the topography of locally periodic microstructures on a nearly planar surface or embedded into nearly planar stratified structures. In particular, the present invention relates to an optical device utilizing light diffracted from semi-periodic microstructure to determine the topography of the structure.

BACKGROUND OF THE INVENTION

Process and quality control of semi-periodic microstructures with structures ranging from microns to nanometers plays an important role in fabrication of optoelectronics, optical and microelectronic devices. One approach to perform quality control on a microstructure is to detect the diffracted light intensities from the microstructure. The light intensities for the different diffracted orders together with a computer algorithm may then be used to produce a topographic image of the microstructure.

Process and quality control of microstructures includes illuminating the microstructure with broad banded light, and measuring the diffracted intensities for all wavelengths and diffracted orders. These data are then used to generate a topography image of the microstructure using a computer algorithm. The illuminating optics is positioned in the vicinity of the microstructure surface and perpendicular to it for optimal detection of the diffracted intensities. The diffracted light orders are collected by collimating optics and incident on a detector system. The detector system may collect those orders parallel or one at a time.

For each wavelength the intensity of the diffracted orders form a distributional pattern, which may be used to uniquely determine the microstructure topography using a computer algorithm. The measurement is rapid and non-destructive since the invention is based on an optical technique.

There are a number of existing techniques available for measuring the surface topography of samples having such small structures. These include:

Electron beam imaging is a technique where a focused electron beam is provided to create an image of a specimen. For microstructure studies the prevalent method of using a focused electron beam is the scanning electron microscopy (SEM). The electron beam creates secondary electrons originating from the upper part of the surface and the generation of these electrons depends on material and geometry. Thus an image is obtained by measuring the current of secondary electrons from scans of the beam across the surface. SEM is capable of measuring features of 1 nm.

However, electron beam imaging has some drawbacks:
1. The method does not reveal depth information
2. Destructive method when profile of the structure is measured by cross-sectional technique
3. Sample environment during measurement is vacuum
4. Conductive coating of non-conductive structures is necessary in order to enhance the generation of secondary electrons. This alters the structure to be measured.
5. Build-up of surface charge affects the measurement resulting in distorted images Scanning probe microscopy (SPM) utilizes a small mechanical probe brought very close to the surface of the specimen detecting the proximity of surface atoms. By this technique an image of the surface topography is obtained by scanning the probe across the surface recording the vertical (height) adjustments of the probe such that a constant response between surface and probe is maintained. The atomic force microscope (AFM) belongs to the group of SPM's that sense the atomic forces between the probe and surface. The technique gives features of few nanometers, however the technique suffers from
1. Topographical distortions of image due to folding of probe shape and surface.
2. Structures having high aspect ratio cannot be measured.

Both the electron beam imaging and the scanning probe microscopy suffer from being operator demanding and time consuming. Another limitation to these techniques is lack of measuring embedded structures in samples.

Optical profilometry is a method where a light beam having a small spot size is applied to produce an image of the surface of a sample. Interference between light reflected from the sample and a known surface is used to obtain height information. Thus, scanning across the surface provides the topographic image of the sample. The method has potential of conducting vertical measurements very accurately. However, resolution of lateral features is limited by the spot size of the light beam, which is in the range of a micron.

In contrast, the herein presented method and apparatus of the invention provide with an improved characterization technique to obtain spatial features of symmetric and asymmetric semi-periodic structure located at the surface or embedded in nearly planar samples. The apparatus collects sufficient data for uniquely determination of the arbitrary shaped profile. The measurement of the semi-repeated structure is non-destructive, fast, accurate, reproducible and reliable.

U.S. Pat. No. 5,963,329 discloses an apparatus and a method for determining the profile of periodic lines on a substrate. The substrate is illuminated with a broadband light and light diffracted by the structure is collected, measured and recorded as function of wavelength. The determination of the profile is conducted as follows. The intensity of the diffracted light is calculated from a seed model of the profile using Maxwell's equations. Comparison between the calculated intensity and the collected intensity vs. wavelength curve is performed to adjust the parameters of the model such that the measured and modeled intensities eventually match.

However, the apparatus and method of U.S. Pat. No. 5,963,329 has the following disadvantages:
1. It may only be applied to symmetric periodic line structures,
2. the recorded data used in the profile determination is only sufficient for symmetric structures. An attempt to extend the described invention to asymmetric profiles will lead to un-determined equation systems that are incapable of calculating the profile in a unique way, and
3. it may only be applied to repeated structures having collinear grating vectors.

U.S. Pat. No. 6,281,974 discloses a method for measuring at least one desired parameter of a patterned structure having a plurality of features defined by a certain process of its manufacturing. The structure represents a grid having at least one cycle formed of at least two locally adjacent elements having different optical properties in respect of an Incident radiation. An optical model, based on at least some of the features of the structure is provided. The model is capable of determining theoretical data representative of photometric intensities of light components of different wavelengths specularly reflected from the structure and of calculating said at least one desired parameter of the structure. A measurement area, which is substantially larger than a surface area of the structure defined by the grid cycle, is illuminated by an incident radiation of a preset substantially wide wavelength range. Light component substantially specularly reflected from the measurement area is detected and measured data representative of photometric intensities of each wavelength within the wavelength range is obtained. The measured and theoretical data satisfies a predetermined condition. Upon detecting that the predetermined condition is satisfied, said at least one parameter of the structure is calculated.

The method disclosed in U.S. Pat. No. 6,281,974 suffers from basically the same drawbacks as U.S. Pat. No. 5,963,329—namely, that since only information in the zero order diffraction beam is recorded the profile determination is only sufficient for symmetric structures. An attempt to apply the method of U.S. Pat. No. 6,281,974 to asymmetric profiles will lead to un-determined equation systems that are incapable of calculating the profile in an unambiguous manner.

In view of the problems and disadvantages discussed above there is a need for an improved technique for quality control of microstructures that reduces the profile measurements uncertainties and avoids damaging of the microstructure to be tested. Furthermore, the requirements for high quality profile measurements are relaxed with the present invention, thus decreasing the complexity and cost for quality control Inspection of microstructures.

Thus, it is an object of the present invention to provide a non-destructive optical method and an apparatus for rapid, accurate, reproducible, unique and reliable determination of the surface topography of samples having semi-periodic structures deposited directly onto a nearly planar sample, or onto a film deposited on a nearly planar sample, or embedded within a film.

It is a further object of the present invention to provide a method for determination of the 3D profile of the semi-periodic structure based on measurements of light diffracted from the sample having the semi-periodic structure.

SUMMARY OF THE INVENTION

It is well known that diffracted light generated by illumination of periodic structures are strongly dependent on the geometry and material properties of the structure. The present invention utilizes the geometrical sensitivity of diffraction to determine the profile shape of the periodic structure. More specific, the present invention relates to a method and an apparatus for measuring the profile shape of a semi-periodic structure. By a semi-periodic structure means a sample having locally two-dimensional array of almost identical three-dimensional elements on a planar surface, a sample having locally two-dimensional array of almost identical three-dimensional elements on a film, or embedded within a film.

A collimated light beam diffracted by a periodic structure generates a discrete set of propagating beams. The directions of these diffracted beams are solely given by the local periodicity of the repeated structure. The intensity distribution of the diffracted beams, however, depends strongly of the profile shape of the repeated structure. This dependency on the incident illumination angle, wavelengths, and diffraction order are used to reconstruct the arbitrary shaped profile of the repeating structure. A direct implication of the dependency is for instance used to distinguish between symmetric and asymmetric microstructures in the following way. The diffraction intensity normalized to the incident light, for a symmetric profile produces even and odd diffraction orders of equal magnitude, whereas the diffraction intensity normalized to the incident light, for an asymmetric profile generally produces even and odd diffraction orders of non-equal magnitude.

The above-mentioned objects are complied with by providing, in a first aspect, an apparatus for measuring geometrical profiles of periodic microstructures of a sample, the apparatus comprising a light source for emission of a light beam, polarizing means for polarizing the emitted light beam, focusing means for focusing the polarized light beam on the microstructures of the sample so as to provide, at a number of microstructures, a plurality of illumination angles simultaneously, a collection means for collecting light diffracted from the illuminated microstructures, resolving means for resolving the collected light into diffraction data relating to illumination angles, polarization angles, diffraction orders, and illumination wavelengths, and a reconstruction algorithm for determining the geometrical profile of the Illuminated microstructures, the reconstruction algorithm being adapted to perform the following steps:

comparing the resolved diffraction data with modeled diffraction data from a known geometrical profile, the known geometrical profile being selected from a database of pre-defined families of profiles, or comparing the resolved diffraction data with modeled diffraction data from a known parameterized geometrical profile, the known parameterized geometrical profile being selected by variation of the geometrical profile parameters, the selection of the parameters being performed using minimum norm techniques, the selection being performed using minimum norm techniques, repeating adjusting the geometrical profile of the known selected geometrical profile until the modeled diffraction data matches the resolved diffraction data within predetermined tolerances.

The light source may comprise a broadband light source, such as Xenon, Deuterium, or halogen lamp. Alternatively, the light source may comprise a substantially monochromatic light source, such as a laser. The focusing means and the collection means may comprise a lens system. The focusing means and the collection means may each comprise a lens system, which could be the same lens system.

The polarizing means may comprise a beam splitter, the beam splitter generating a reference beam and an illumination beam. The resolving means may comprise an Imaging detection system.

The imaging detection system may comprise means for generating a plurality of light beams having different center wavelengths and propagating in different directions. The imaging detection system may further comprise an array of light sensitive elements, the array of light sensitive elements being adapted to be illuminated by the generated plurality of light beams.

Alternatively, the imaging detection system may comprise an array of color light sensitive elements, the color sensitivity being provided by a color mask positioned in front of the light sensitive elements. The array of light sensitive elements may form part of a CCD array, an InGaAs array, a PbSe array, a PbS array, a superconduction Tunnel Junction array, or any combination thereof.

In a second aspect, the present invention relates to a non-destructive method for measuring geometrical profiles of periodic microstructures of a sample, the method comprising the steps of:

providing a light source for emission of a light beam, polarizing the emitted light beam, and transmitting the polarized light beam to a refractive member, focusing the transmitted and polarized light beam on the microstructures of the sample using the refractive member so as to provide, at a number of microstructures, a plurality of illumination angles simultaneously, collecting light diffracted from the illuminated microstructures using a collection system, and resolving the collected light into diffraction data relating to illumination angles, polarization angles, diffraction orders, and illumination wavelengths, and determining the geometrical profile of the illuminated microstructures using a reconstruction algorithm, the reconstruction algorithm comprising the steps of:

comparing the resolved diffraction data with modeled diffraction data from a known geometrical profile, the known geometrical profile being selected from a database of pre-defined families of profiles, or comparing the resolved diffraction data with modeled diffraction data from a known parameterized geometrical profile, the known parameterized geometrical profile being selected by variation of the geometrical profile parameters, the selection of the parameters being performed using minimum norm techniques, the selection being performed using minimum norm techniques, repeating adjusting the geometrical profile of the known selected geometrical profile until the modeled diffraction data matches the resolved diffraction data within predetermined tolerances.

In a third aspect, the present invention relates to the use of the method according to the second aspect for monitoring formation or alternation of periodic microstructures.

The formation or alternation may be monitored by monitoring respective formation or alternation of the microstructures. Alternatively, the formation or alternation may be monitored by monitoring formation or alternation of an associated target structure.

The periodic microstructures may be formed or altered in a semiconductor, metallic, or dielectric material, or combination thereof. The periodic microstructures may be formed or altered using an etching method, such as reactive plasma etching and wet etching. The periodic microstructures may also be formed using lithographic processes, epitaxial growth processes, film deposition processes, or oxidation processes or any combination hereof.

In a fourth aspect, the present invention relates to a computer program code for determining a geometrical profile of illuminated microstructures when said program code is run on a computer, the program code being adapted to perform the following steps:

resolving collected light data into diffraction data relating to illumination angles, polarization angles, diffraction orders, and illumination wavelengths, comparing the resolved diffraction data with modeled diffraction data from a known geometrical profile, the known geometrical profile being selected from a database of pre-defined families of profiles, or comparing the resolved diffraction data with modeled diffraction data from a known parameterized geometrical profile, the known parameterized geometrical profile being selected by variation of the geometrical profile parameters, the selection of the parameters being performed using minimum norm techniques, the selection being performed using minimum norm techniques, and repeating adjusting the geometrical profile of the known selected geometrical profile until the modeled diffraction data matches the resolved diffraction data within predetermined tolerances.

In a fifth aspect, the present invention relates to a computer readable medium carrying a computer program code for determining a geometrical profile of illuminated microstructures when said program code is run on a computer, the program code being adapted to perform the following steps:

resolving collected light data into diffraction data relating to illumination angles, polarization angles, diffraction orders, and illumination wavelengths, comparing the resolved diffraction data with modeled diffraction data from a known geometrical profile, the known geometrical profile being selected from a database of pre-defined families of profiles, or comparing the resolved diffraction data with modeled diffraction data from a known parameterized geometrical profile, the known parameterized geometrical profile being selected by variation of the geometrical profile parameters, the selection of the parameters being performed using minimum norm techniques, the selection being performed using minimum norm techniques, and repeating adjusting the geometrical profile of the known selected geometrical profile until the modeled diffraction data matches the resolved diffraction data within predetermined tolerances.

In one embodiment, the invention is directed to a method for obtaining the profile shape from a semi-periodic symmetric microstructure. The method includes adjustment of working distance between microstructure and collimating optics, selection of wavelength range, selection of illumination angle, selection of diffraction order, selection of polarization angle to be measured, set the convergence limits, selection of a seed model for the computer calculations and detection of the reflected diffracted intensity normalized to the intensity of the incident light for the selected wavelengths or the detected light intensity of a known and qualified reference sample without a repeated structure for the selected wavelengths. The recorded data is processed by the apparatus using an algorithm for determining the profile shape of the microstructure by adjusting the topography of the seed profile until the calculated diffraction intensities match the measured diffraction intensities within the specified success criteria.

In another embodiment, the invention is directed to a method for obtaining the profile shape from a semi-periodic symmetric microstructure. The method includes adjustment of working distance between microstructure and collimating optics, selection of wavelength range, selection of illumination angle, selection of diffraction order, selection of polarization angle to be measured, set the convergence limits, and detection of the reflected diffracted intensity normalized to the intensity of the incident light for the selected wavelengths or the detected light intensity of a known and qualified reference sample without a repeated structure for the selected wavelengths. The recorded data is processed by the apparatus using an algorithm for determining the profile shape of the microstructure by adjusting the topography of the profile found from the measured diffraction intensities until the calculated diffraction intensities match the measured diffraction intensities within the specified success criteria.

In another embodiment, the invention is directed to a method for obtaining the profile shape from a semi-periodic symmetric microstructure. The method includes adjustment of working distance between microstructure and collimating optics, selection of wavelength, selection of illumination angle range, selection of diffraction order, selection of polarization angle to be measured, set the convergence limits, selection of a seed model for the computer calculations and detection of the reflected diffracted intensity normalized to the intensity of the incident light for the selected illumination angles or the detected light intensity of a known and qualified reference sample without a repeated structure for the selected illumination angles. The recorded data is processed by the apparatus using an algorithm for determining the profile shape of the microstructure by adjusting the topography of the seed profile until the calculated diffraction intensities match the measured diffraction intensities within the specified success criteria.

In another embodiment, the invention is directed to a method for obtaining the profile shape from a semi-periodic symmetric microstructure. The method includes adjustment of working distance between microstructure and collimating optics, selection of wavelength, selection of illumination angle range, selection of diffraction order, selection of polarization angle to be measured, set the convergence limits, and detection of the reflected diffracted intensity normalized to the intensity of the incident light for the selected illumination angles or the detected light intensity of a known and qualified reference sample without a repeated structure for the selected illumination angles. The recorded data is processed by the apparatus using an algorithm for determining the profile shape of the microstructure by adjusting the topography of the profile found from the measured diffraction intensities until the calculated diffraction intensities matches the measured diffraction intensities within the specified success criteria.

Guided by the descriptive pattern of the four embodiments the remaining embodiments are listed in TABLE 1 for clarity and legibility. The already described embodiments are also included in the table.

BRIEF DESCRIPTION OF THE DRAWINGS

The above set forth and other features of the invention will be more apparent when read in connection with the accompanying drawings, wherein.

Figure 1:
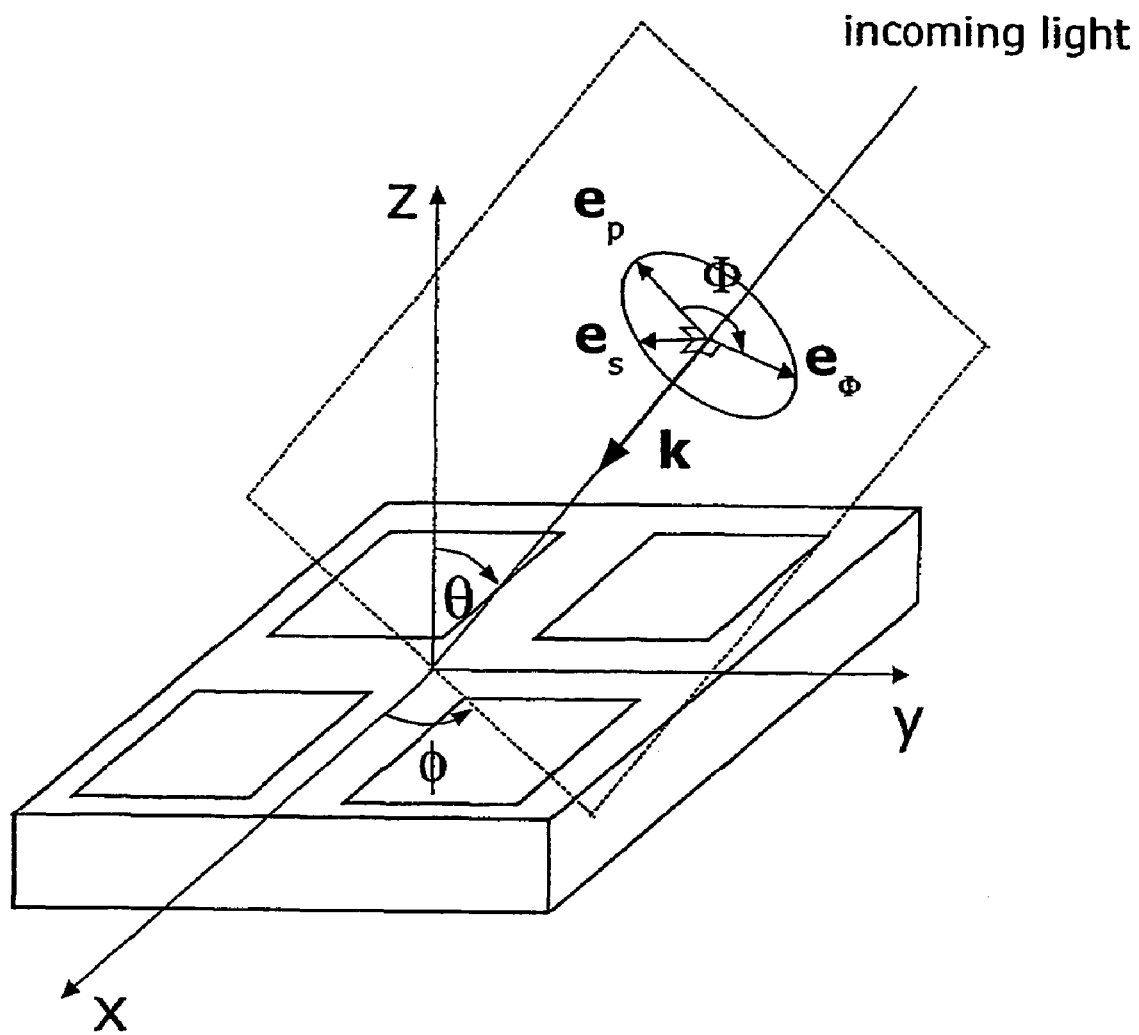
FIG. 1 defines the propagation of light incident on a sample having a repeated structure. The propagation direction is given by the polar angle $\theta$ and the azimuth angle $\phi$. The polarization of the light is specified by the angle $\Phi$ with respect to the unit vectors $e_s$ and $e_p$. These vectors represent the TE mode and the TM mode, respectively. The vector $e_s$ is in the plane of incidence and $e_p$ is perpendicular to it, and both being orthogonal to the incident wave vector k. The Cartesian coordinate system has the x-axis along one of the periodic directions.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

An illustration of the principle of the invention is in FIGS. 1-9. In FIG. 1 is defined the illumination geometry of a sample having a locally repeated structure. The structure is Illuminated by a plane electromagnetic wave characterized by its wavelength $\lambda$, linear polarization $\Phi$, and the direction of propagation given by the incident angle $\theta$ and the azimuth angle $\phi$. The Cartesian coordinate system has the x-axis along one of the periodic directions.

Figure 2:
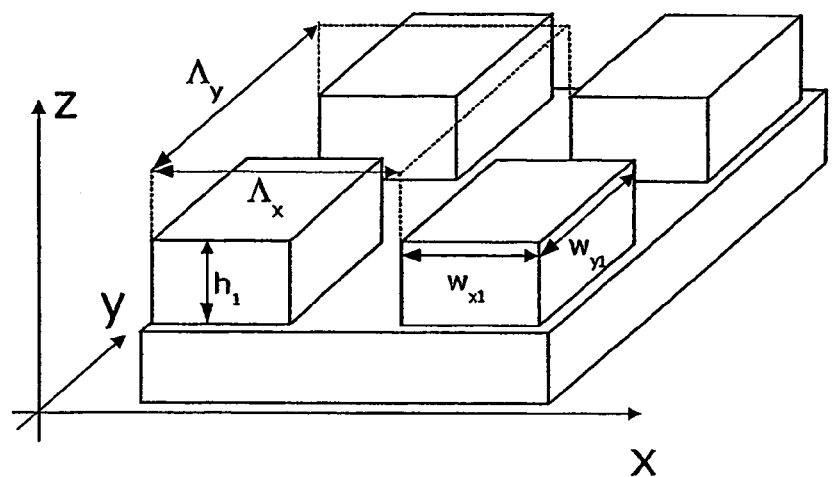
FIG. 2 is a three-dimensional periodic sample, and more specifically, a two-dimensional array of symmetric and rectangular elements on a surface. The parameters for the periodic structure are included.
Figure 3:
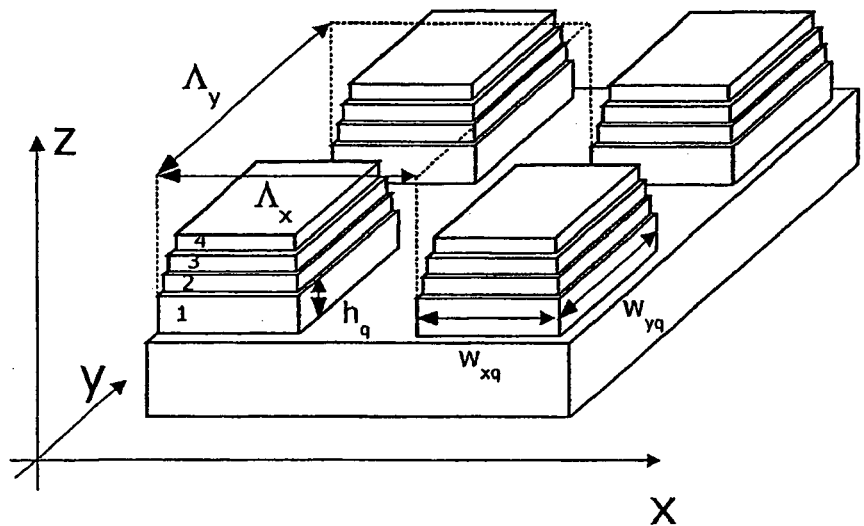
FIG. 3 is an three-dimensional periodic sample, and more specifically, a two-dimensional array of elements that is slightly altered from the rectangular shape of FIG. 2 to an asymmetric shape composed of multiple slabs. The parameters for the periodic structure are included.
Figure 4:
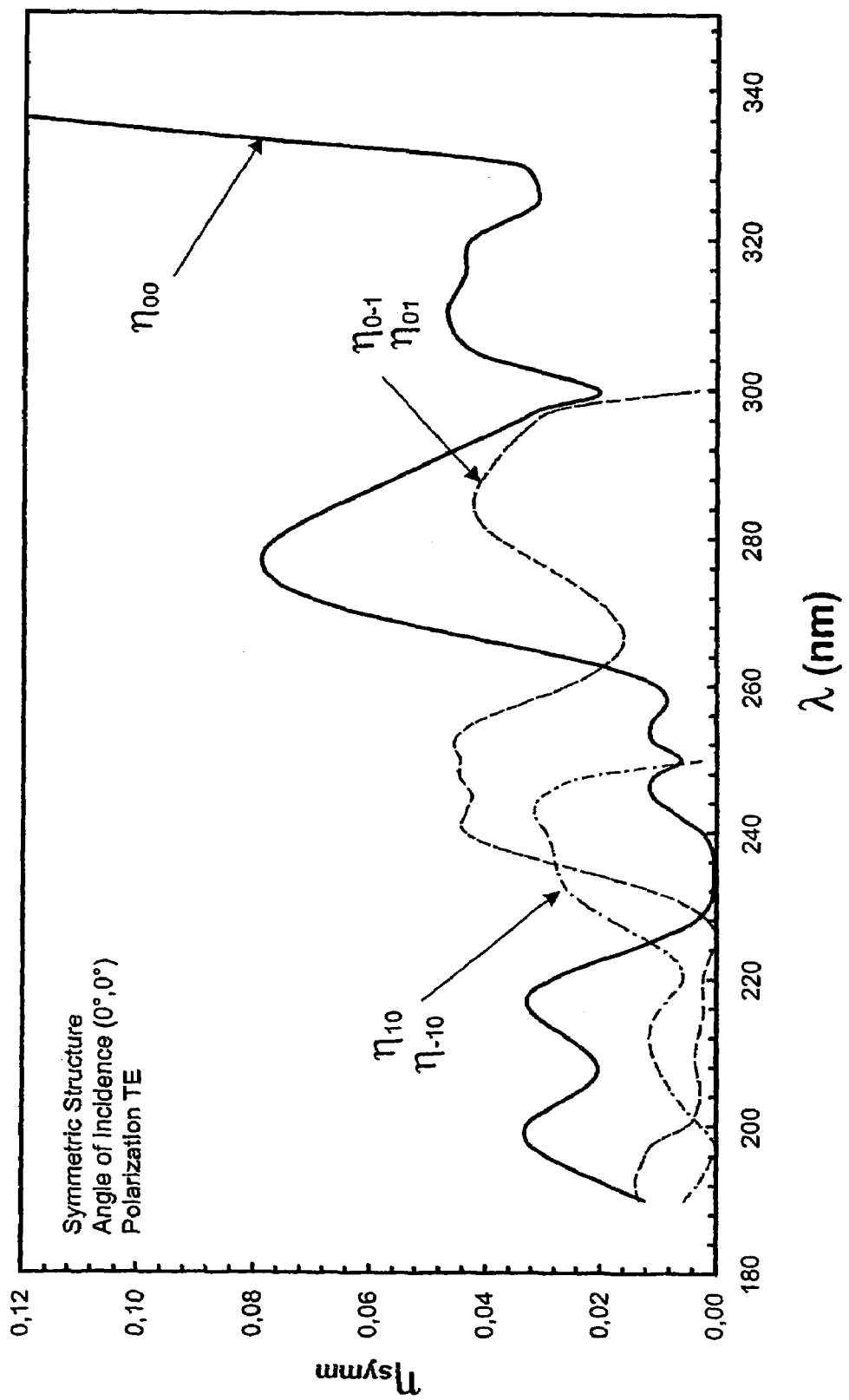
FIG. 4 is showing calculated diffraction efficiency as function of wavelength curves for various diffraction orders for the symmetric structure given in FIG. 2.
Figure 5:
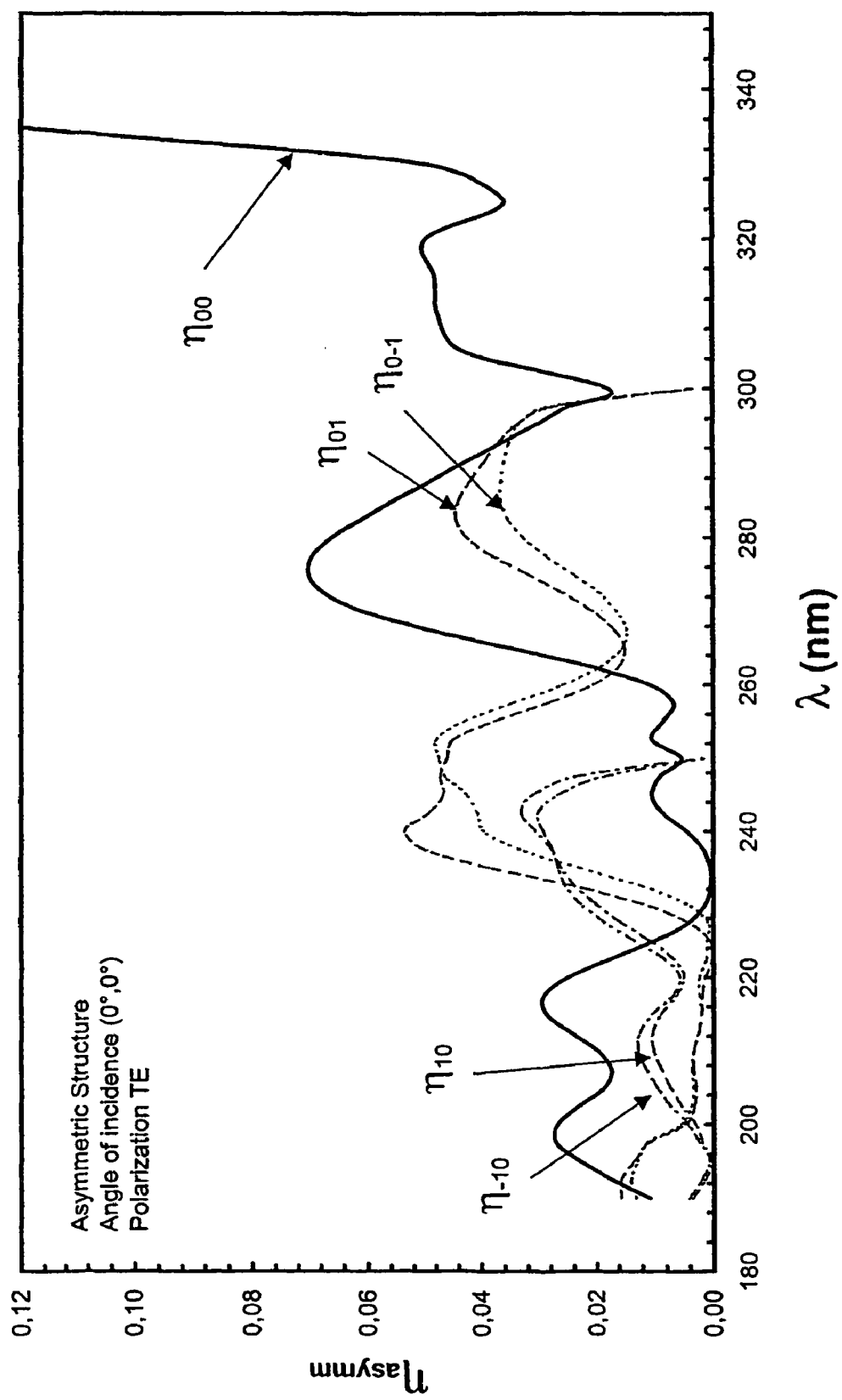
FIG. 5 is showing calculated diffraction efficiency as function of wavelength curves for various diffraction orders for the asymmetric structure given in FIG. 3.
Figure 6:
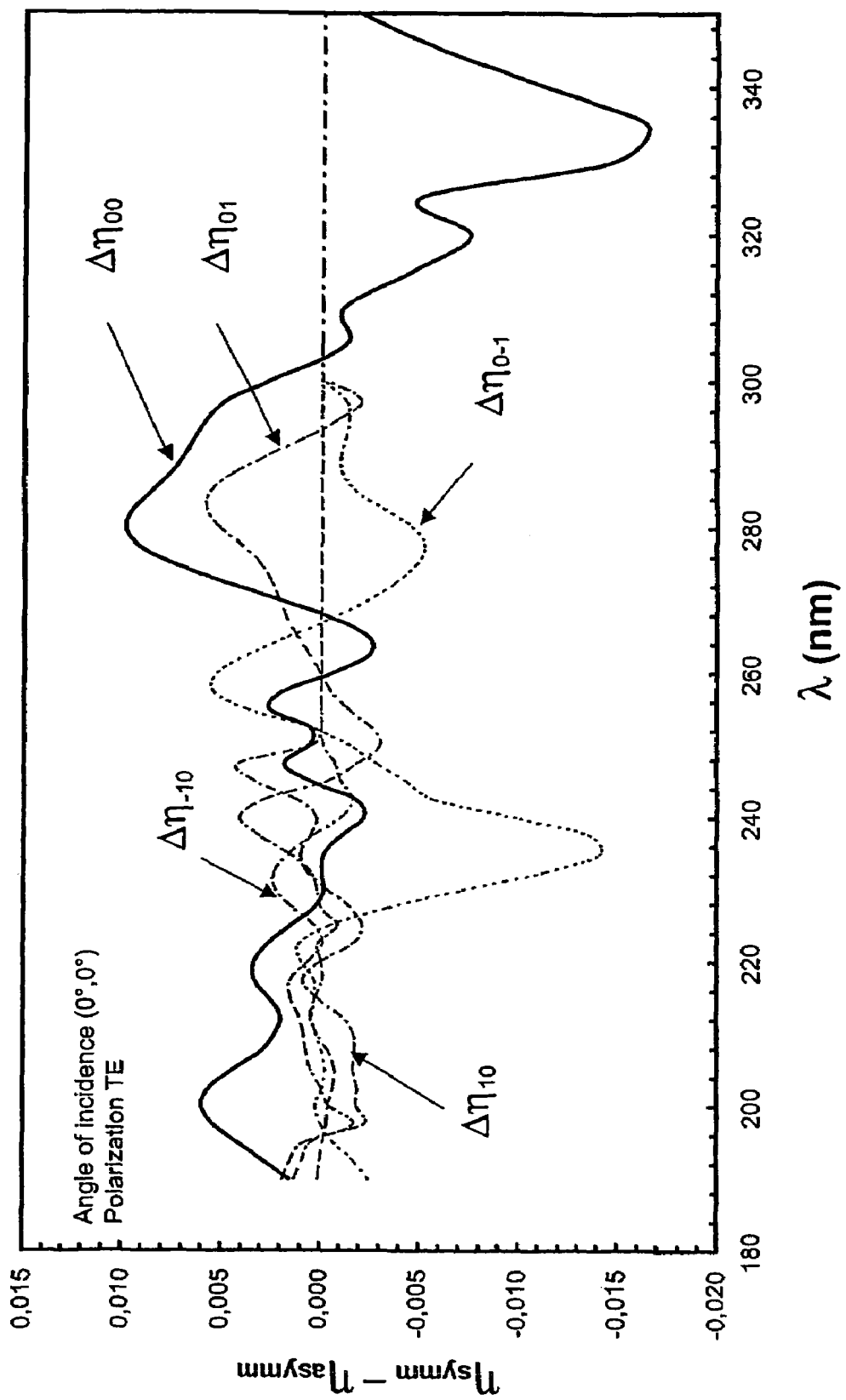
FIG. 6 is showing the difference between the symmetric and asymmetric of calculated diffraction efficiency as function of wavelength curves shown in FIG. 4 and FIG. 5 demonstrating the sensitivity of diffraction efficiencies to small changes of the repeated profile shape.
Figure 7:
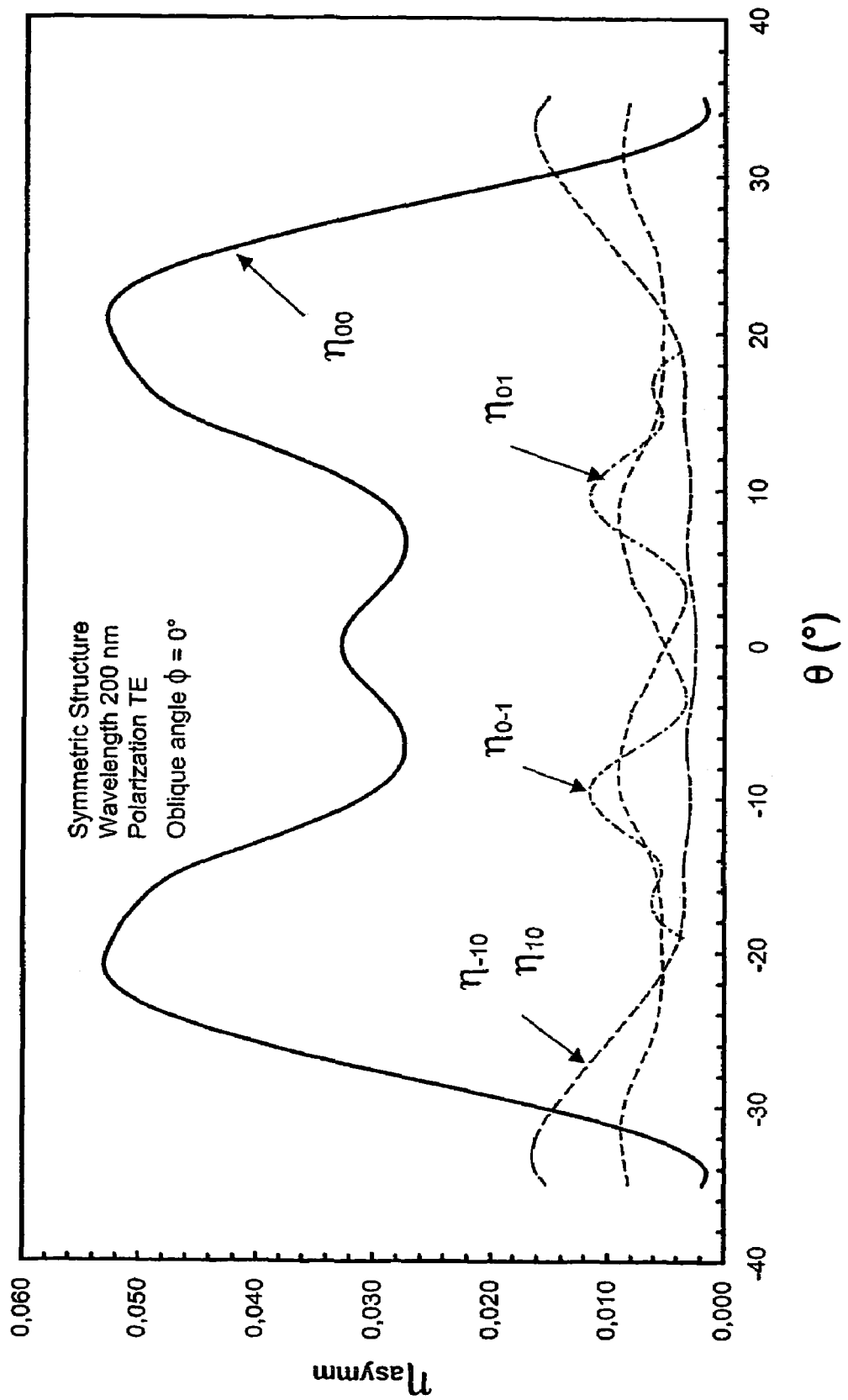
FIG. 7 is showing calculated diffraction efficiency as function of incident illumination angle curves for various diffraction orders for the symmetric structure given in FIG. 2.
Figure 8:
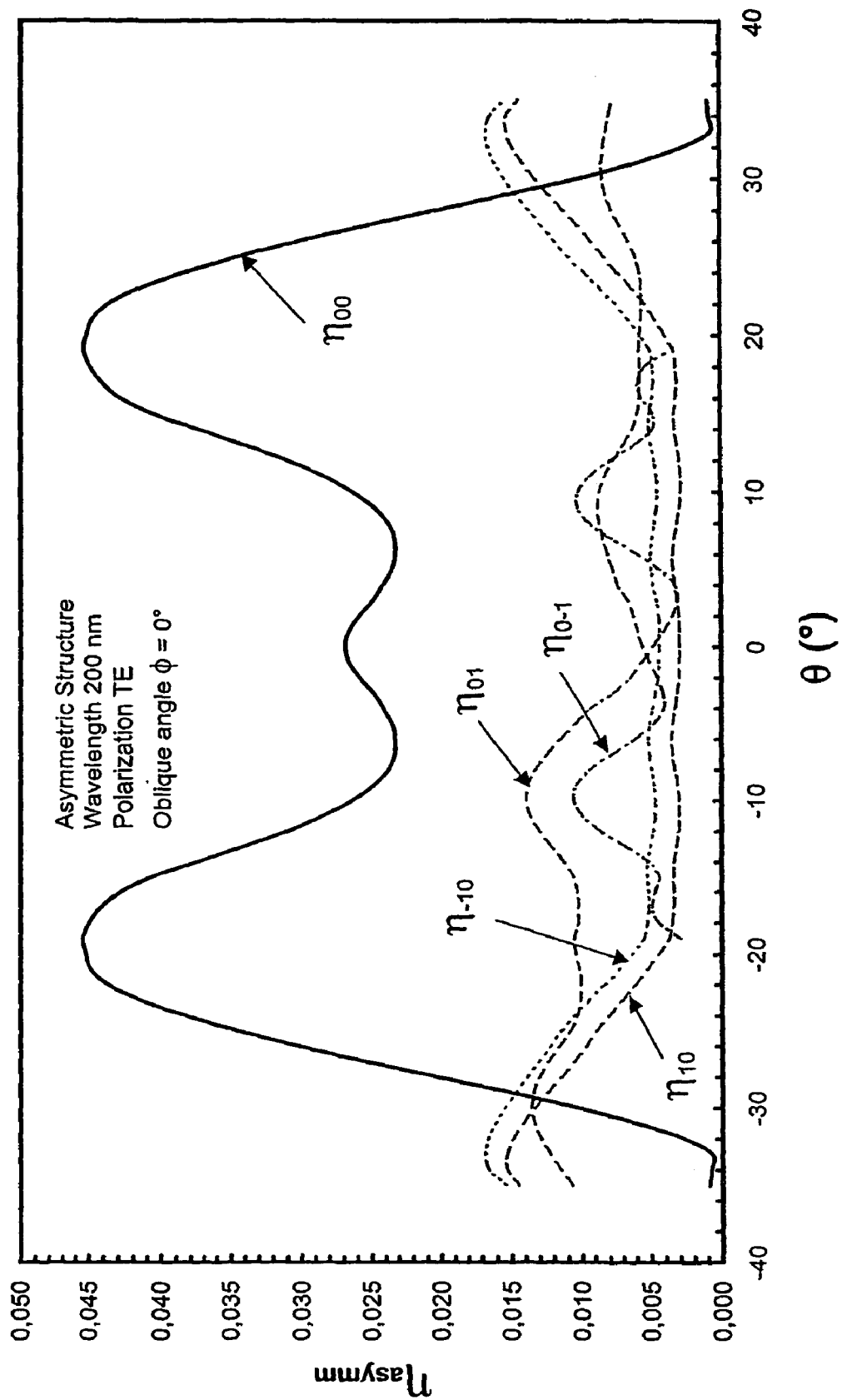
FIG. 8 is showing calculated diffraction efficiency as function of incident illumination angle curves for various diffraction orders for the asymmetric structure given in FIG. 3.
Figure 9:
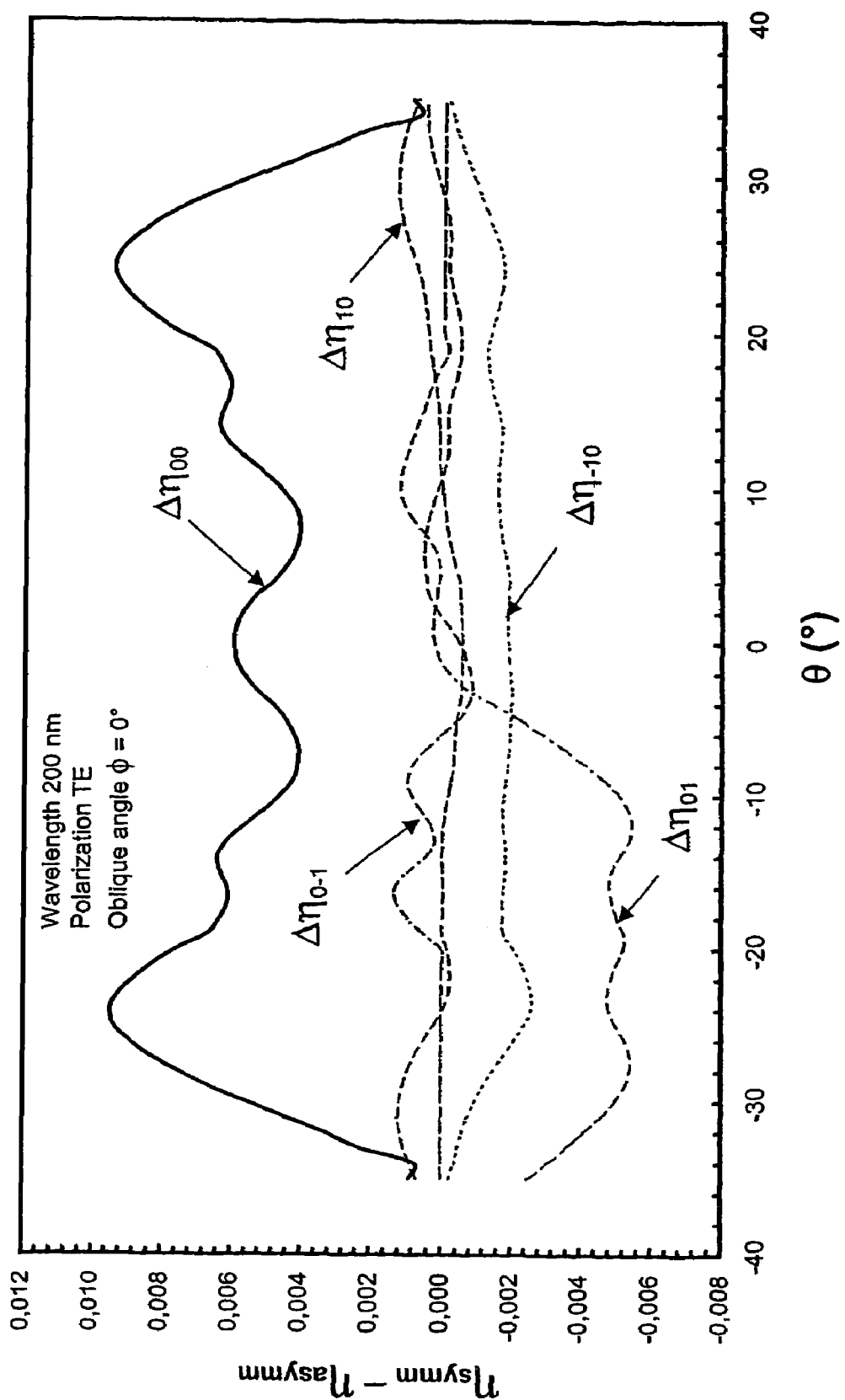
FIG. 9 is showing the difference between the symmetric and asymmetric of calculated diffraction efficiency as function of incident illumination angle curves shown in FIG. 7 and FIG. 8 demonstrating the sensitivity of diffraction efficiencies to small changes of the repeated profile shape.

The intensity of light diffracted by the structure normalized to the intensity of the incident light, denoted as the diffraction efficiency, is calculated for a symmetric profile represented by a box in FIG. 2 and an asymmetric profile described in FIG. 3. The latter profile alters just slightly from the rectangular profile. In FIGS. 4-6 are plotted the calculated diffraction efficiency as function of wavelength for various diffraction orders, and in FIG. 7-9 are plotted the calculated diffraction efficiency as function of incident illumination angle for different diffraction orders at fixed wavelength of 200 nm. The plots demonstrate that symmetric profiles produces even and odd diffraction orders of equal magnitude as expected for normal illumination. This is, however, not observed for the asymmetric profile where the diffraction efficiency generally differs for even and odd orders. The sensitivity of diffraction intensity to minor changes is clearly observed in FIG. 6 and FIG. 9 of the symmetric and asymmetric profiles given in FIGS. 2 and 3.

The apparatus in the invention employs a light source delivering a light beam that is collimated, polarized and focused onto a small repeated structure to be measured. The focused light beam is diffracted by the periodic structure and detected by an imaging detector. Various potential embodiments of the apparatus are presented in FIG. 11-16 including details.

Figure 11:
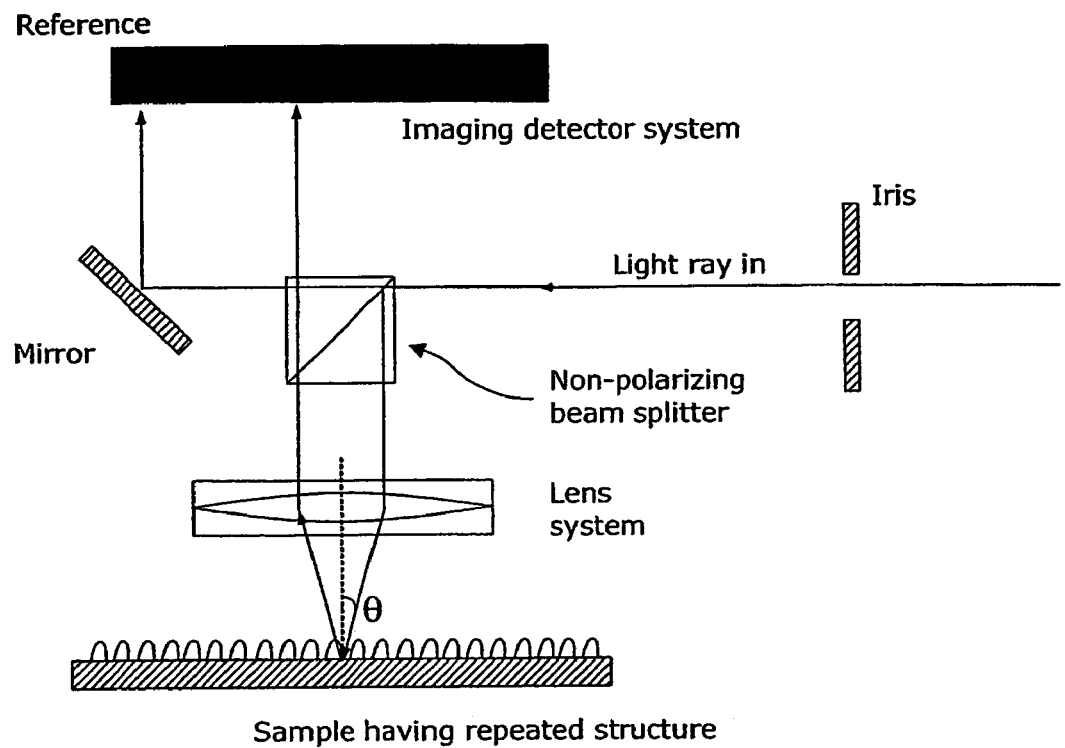
FIG. 11 shows a detail of an embodiment for an optical system for collecting reflected diffracted light intensity data sufficient to determine the profile of the repeated structure. The focused light beam is composed of rays having a range of incident angle and exemplified in the sketch by a ray of incident angle $\theta$. The detection of the reflected diffracted ray is illustrated to have a one-to-one relation between the Incident angle and the location on the detector array (higher orders are neglected for simplicity).
Figure 12:
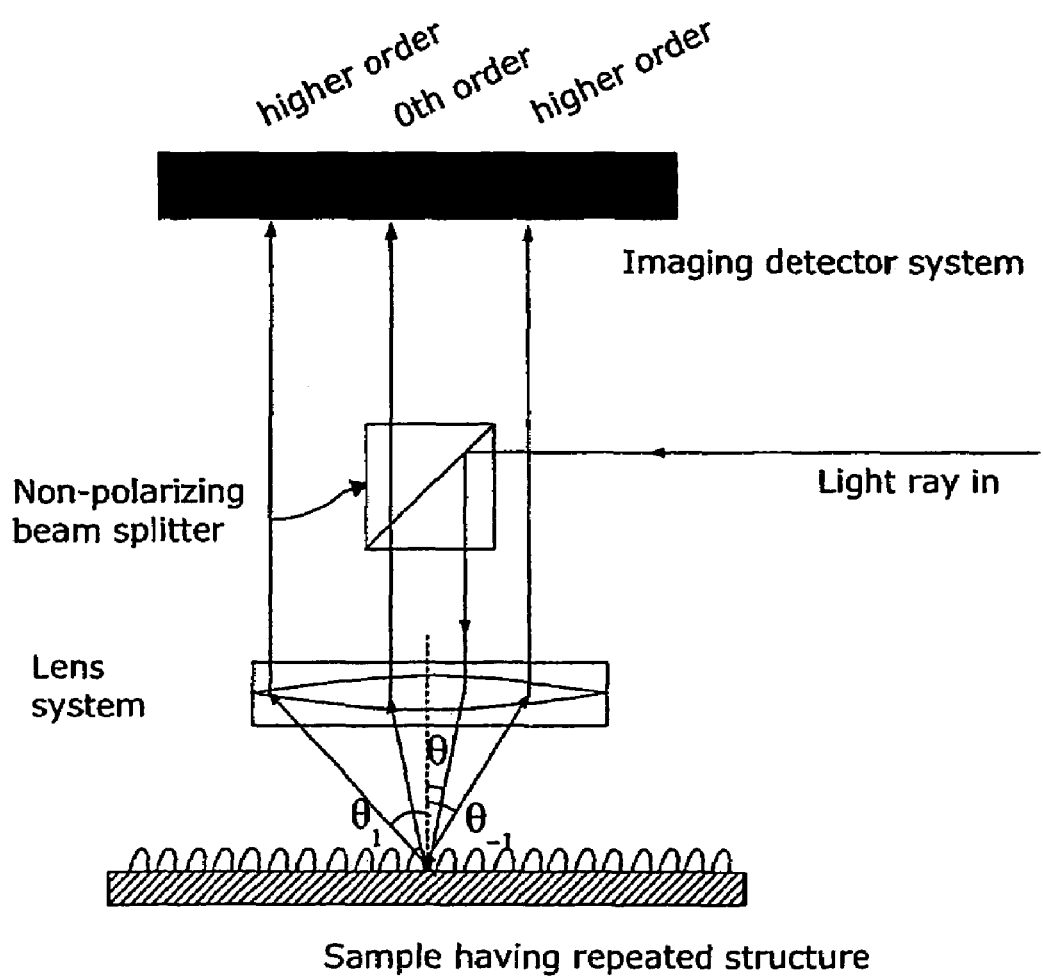
FIG. 12 shows a detail of an embodiment for an optical system for collecting reflected diffracted light intensity data sufficient to determine the profile of the repeated structure. The collimated and polarized light is focused by a lens system onto the periodic structure of a sample. The periodicity of the sample diffracts the light in discreet and distinct directions. The detection of the reflected diffracted light is illustrated to have a one-to-one relation between the diffraction order and the location on the detector array.

FIGS. 11 and 12 show the apparatus used to collect reflective diffracted light during illumination of a sample having repeated structures. A collimated and polarized light beam delivered by a broadband light source system is divided by a non-polarizing beam splitter. The beam passed through the beam splatter is reflected by a mirror and directed incident onto a detector array and may serve as reference measurement in order to normalizing the diffracted signals. The other beam exits the beam splatter with direction incident on a lens system, which focus the beam onto the periodic structure. The reflected diffraction light, leaving the periodic structure, has discrete and distinct directions and is collected by the lens system, which directs the light incident to the imaging detection array. This lens system is designed to collect diffracted light with large diffraction angles, i.e. propagation direction of lower diffraction orders are within the numerical aperture of the lens system. Note that the zero-order diffracted light passes through the beam splitter before reaching the imaging detector.

The identification of the diffraction orders of the collected diffraction light is unique due to a one-to-one relation between the diffraction order and the location on the detector array as illustrated in FIG. 12. This feature provides simultaneously collection of various orders of reflected diffraction light intensities.

The repeated structure is illuminated by a focused beam meaning that the structure is exposed to a whole range of incident and azimuth angles simultaneously. The reflected diffraction light from the various propagation directions is detected by the imaging system after collection by the lens system. This is exemplified in FIG. 11 by a ray of incident angle $\theta$. The iris controls the size of the incident angle interval. The detection of the reflected diffracted ray is illustrated to have a one-to-one relation between the propagation direction $(\theta,\phi)$ and the location on the detector array. This is valid for sufficiently small illumination spot size on the repeated structure and obtainable by adjusting the distance between the repeated structure and the lens system. This feature provides simultaneously angular resolution of the reflected diffraction light intensities using a passive mechanical method.

Figure 13:
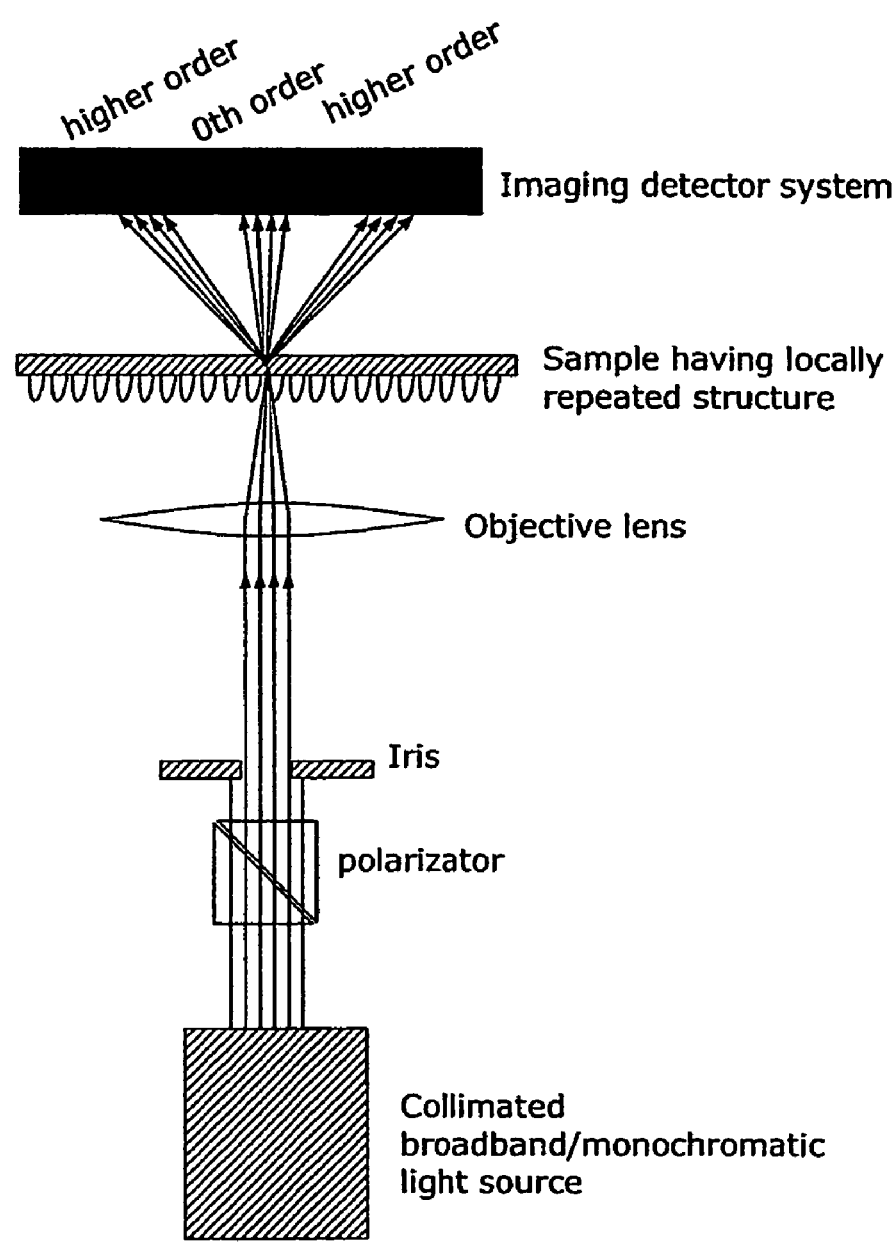
FIG. 13 shows two embodiments of an optical system for collecting transmitted diffracted light intensity data sufficient to determine the profile of the repeated structure. One embodiment provides a collimated, polarized and monochromatic light diffracted by a sample having a periodic structure, transmitted through the sample, and collected by an imaging detector, e.g. CCD-camera. The second embodiment uses collimated and polarized broadband light that is diffracted by a sample having a periodic structure, transmitted through the sample, and collected by an imaging spectrodetector, e.g. Superconducting Tunnel Junction (STJ)-array.

FIG. 13 shows the apparatus for collecting transmitted diffraction light during illumination of a transparent or semi-transparent sample having repeated structures. A collimated and polarized light beam delivered by a broadband light source system is directed incident on an objective lens system, which focus the beam onto the periodic structure. The transmitted diffraction light, leaving the periodic structure, has discrete and distinct directions and collected direct by an imaging detection array or through another objective lens system to an imaging detection array.

Figure 14:
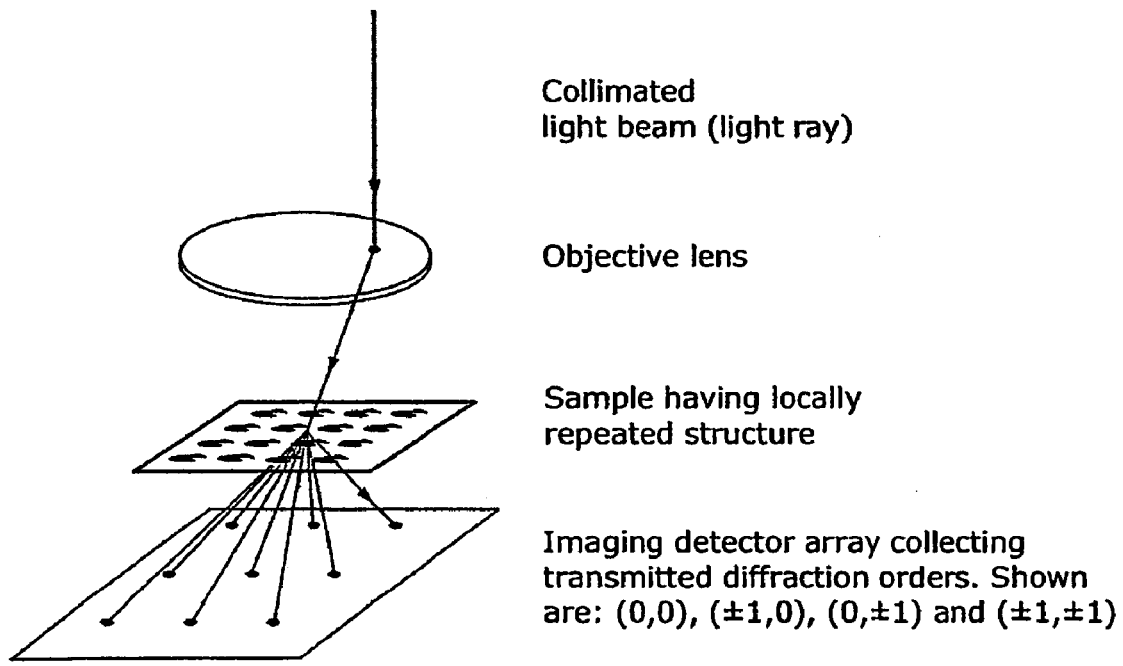
FIG. 14 shows a detail of FIG. 13. The collimated and polarized light is directed by a lens system onto the periodic structure of a sample. The periodicity of the sample diffracts the light in discrete and distinct directions. The detection of the transmitted diffracted light is illustrated to have a one-to-one relation between the diffraction order and the location on the detector array.

The diffraction orders of the collected diffraction light are uniquely identified due to a one-to-one relation between the diffraction order and the location on the detector array as illustrated in FIG. 14. This feature provides simultaneously collection of various orders of transmitted diffraction light intensities.

Figure 15:
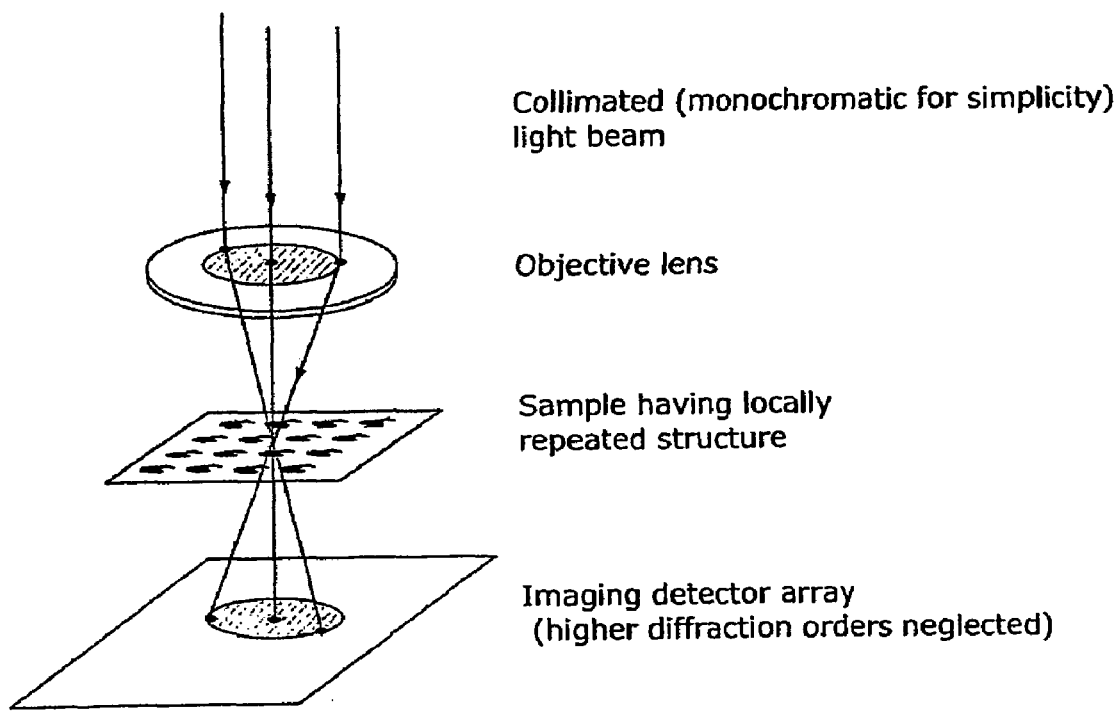
FIG. 15 shows a detail of FIG. 14. The collimated and polarized light is focused by a lens system onto the periodic structure of a sample and the focused light is composed by an ordered set of light rays covering a range of incident angles. The transmitted diffraction light is illustrated to have a one-to-one relation between the incident angle and the location on the detector array (higher orders are neglected for simplicity).

Similar to the reflective diffraction apparatus the repeated structure is illuminated by a focused beam. In FIG. 15 the focused beam is represented by a ray of incident angle $\theta$. The transmitted diffracted ray is illustrated to have a one-to-one relation between the propagation direction $(\theta,\phi)$ and the location on the detector array. A requirement for the validity of the relationship is a small spot size at the repeated structure, but large enough to cover several periods in both repeated directions.

This feature provides simultaneously angular resolution of the transmitted diffraction light intensities using a passive mechanical method. In order to normalize to transmitted diffraction light the intensity of the light source is measured prior to the measurement.

Grating Equation and Propagation Directions

Figure 10A:
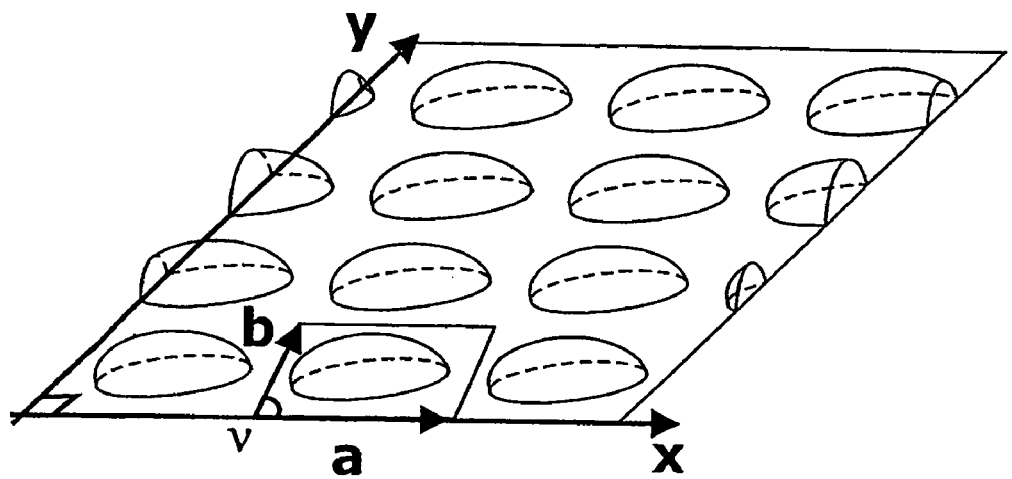
FIG. 10 is illustrating the model of the repeated structure (a). The grating vectors a and b define the unit cell for the repeated structure and are in general non-collinear. The symbol v denotes the angle between the grating vectors. An arbitrary profile is approximated by discretization into multiple slabs (b) where each slab consists of $M_q$ by $N_q$ smaller building blocks or sub slabs (c). Building block (i,j,q) is characterized by its widths $(w_{qi}, w_{qj})$ and off-sets $(d_{qi}, d_{qj})$ in the lateral directions, height $h_q$ and index of refraction $n_{ijq}$.
Figure 10B:
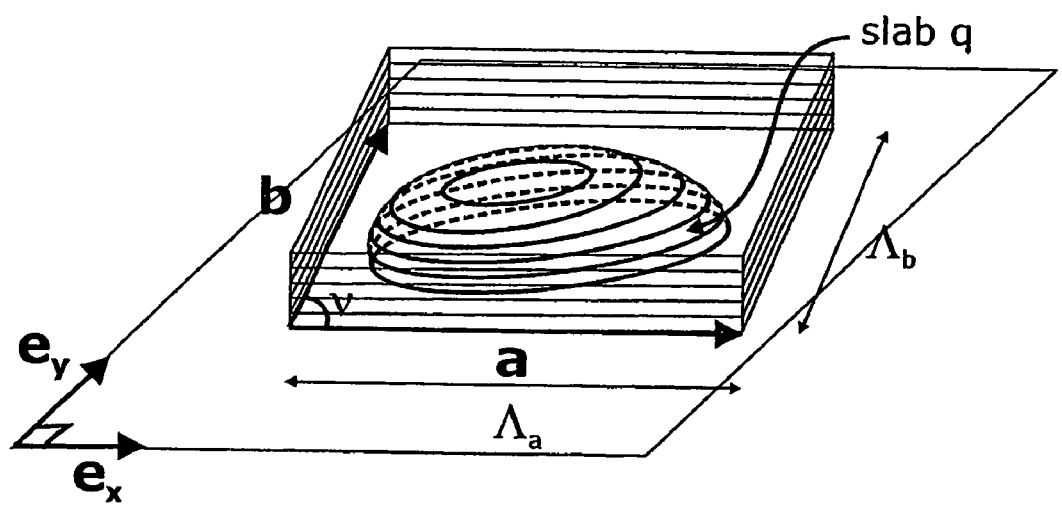
Figure 10C:
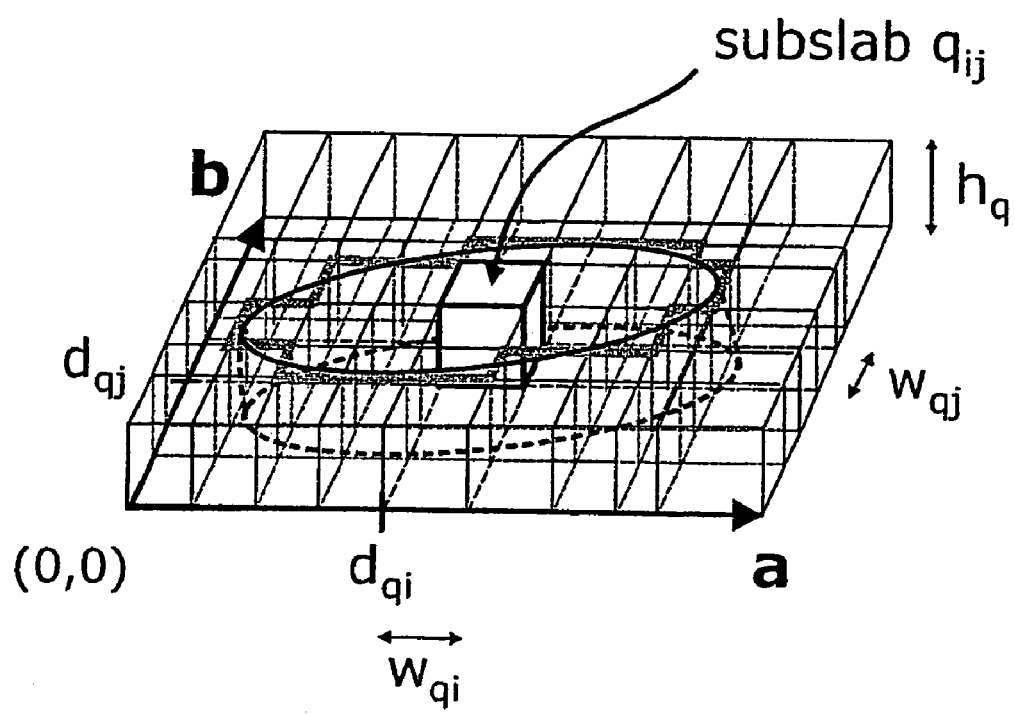

The relation between the incident direction of illumination light ($\theta,\phi$) having wavelength $\lambda$, the propagation direction ($\theta_{mn}$, $\phi_{mn}$) of diffracted light of order (m,n), and the grating vectors $a=\Lambda_a(1,0)$ and $b=\Lambda_b(\sin \nu,\cos \nu)$ of the repeated structure, see FIG. 10, is given by the grating equations $$\sin\theta_{mn}\cos\phi_{mn} - \sin\theta\cos\phi = m\frac{\lambda}{\Lambda_a} \quad (1)$$

$$\sin\theta_{mn}\sin\phi_{mn} - \sin\theta\sin\phi = -m\frac{\lambda}{\Lambda_a}\tan\nu + n\frac{\lambda}{\Lambda_b}\sec\nu$$

where the quantities $\Lambda_a$ and $\Lambda_b$ are the periodicity of the grating along the repeated directions and $\nu$ is the angle between the grating vectors. The wavelength of the light before and after diffraction with the periodic structure is unchanged.

The following description outlines a workable procedure for collecting the diffraction efficiency data.

Description of the Diffraction Efficiency Measurement with the Necessary Corrections The diffraction efficiency, i.e. the intensity ratio between the incoming light and the diffracted light, is recorded by the apparatus using following generic procedure for the backscattered and the transmitted diffraction efficencies:

The apparatus for measuring backscattered diffraction efficiency, sketched in FIG. 11, and transmittive diffraction efficiency, sketched in FIG. 13, has a light source delivering the collimated beam. Let the intensity profile of the beam be given by $I_S(x,y)$ where (x,y) represents local coordinates for a cross sectional plan of the beam. Following the path of the beam the light passes a beam-splitter and a lens system transforming the intensity at focal point to $$I_{focus}(\theta,\phi)=\xi_{LS}\xi_{BS}I_S(x,y)$$

where $(x,y)=f \tan \theta(\cos \phi, \sin \phi)$ that relates the propagation direction ($\theta,\phi$) of a perfect focused ray to its corresponding location (x,y) of the collimated beam. The parameter $f$ is the effective focal length for the lens system and $\xi_{element}$ is the light intensity transfer function of the optical elements: the beam splitter (BS) and the lens system (LS). These functions are assumed to be well known.

Backscattered Diffraction Efficiencies

The efficiency of backscattered orders is revealed from measurements of 1) the sample having the periodic structure with the repeated structure in the focal point and 2) a plan featureless substrate of known material also denoted as the reference substrate placed with the surface at the focal point. See FIG. 11.

The imaging detector signal for the reference substrate is $$I_{ref}^{Detector}(x,y)=\xi'_{BS}\xi'_{LS}R(\theta,\phi)I_{focus}(\theta,\phi) \quad (2)$$

where $R(\theta,\phi)$ is the reflectance of a known reference substrate. The reflectance can be found be found from Fresnel's equations and the refractive index of reference substrate material. $\xi'_{LS}$ and $\xi'_{BS}$ denote the intensity transfer function for light entering the lens system and beam splitter in opposite direction.

The imaging detector signal for the sample having a periodic structure is $$I_{sample}^{Detector}(x_{mn}, y_{mn}) = \begin{cases} \xi'_{BS}\xi'_{LS}\eta_{00}(\theta,\phi)I_{focus}(\theta,\phi) & (m,n)=(0,0) \\ \xi'_{LS}\eta_{mn}(\theta_{mn},\phi_{mn})I_{focus}(\theta,\phi) & \text{else} \end{cases} \quad (3)$$

where $\eta_{mn}$ is the backscattered diffraction efficiency of order (m,n). For a perfect lens system the various diffraction orders are detected at $(x_{mn}, y_{mn})=f \tan \theta_{mn}(\cos \phi_{mn},\sin \phi_{mn})$ of the imaging detector array. The relation between the propagation directions for the incident and diffracted rays, $(\theta,\phi)$ and $(\theta_{mn},\phi_{mn})$, (respectively, is given by the grating equation (1).

Thus, the efficiency for backscattered diffraction orders is, after use of Eq. 2 and Eq. 3, $$\eta_{mn}(\theta_{mn},\phi_{mn}) = \begin{cases} R\frac{I_{sample}^{Detector}(x,y)}{I_{ref}^{Detector}(x,y)} & (m,n)=(0,0) \\ \xi'_{BS}R\frac{I_{sample}^{Detector}(x_{mn},y_{mn})}{I_{ref}^{Detector}(x,y)} & \text{else} \end{cases} \quad (4)$$

Transmitted Diffraction Efficiencies

The efficiency of transmitted orders is obtained from 1) measurements of a semi-transparent sample having the periodic structure with the repeated structure in the focal point and 2) direct measurement of the focused light leaving the lens at the same optical distance as the sample. See FIG. 13.

The imaging detector signal for the reference light is $$I_{ref}^{Detector}(x,y)=I_{focus}(\theta,\phi) \quad (5)$$

where $(x,y)=z \tan \theta(\cos \phi, \sin \phi)$ is the detection location on the imaging array for rays leaving the lens system having propagating direction ($\theta,\phi$). The coefficient z is the distance of the detector array to the focal point.

The imaging detector signal for the sample having a periodic structure is $$I_{sample}^{Detector}(x,y)=\eta_{mn}(\theta_{mn},\phi_{mn})I_{focus}(\theta,\phi) \quad (6)$$

where $\eta_{mn}$ is the transmitted diffraction efficiency of order (m,n). The detection location for the diffracted orders $(x_{mn}, y_{mn})$ for rays having propagating direction of $(\theta_{mn},\phi_{mn})$ is related through $(x_{mn},y_{mn})=z \tan \theta_{mn} (\cos \phi_{mn},\sin \phi_{mn})$.

Based on the expressions for the reference and sample signals, Eq. 5 and Eq. 6, the measured efficiency for the transmitted diffraction orders is found by $$\eta_{mn}(\theta_{mn},\phi_{mn}) = \frac{I_{sample}^{Detector}(x_{mn},y_{mn})}{I_{ref}^{Detector}(x,y)} \quad (7)$$

For both the reflective (backscattered) and the transmittive modes of the apparatus the wavelength dependence of the diffraction efficiency is achieved either by 1. Use of, e.g. monochromator, filtering the broad band light source in conjunction with an image detector, say CCD-camera
2. Use of a broadband light source in conjunction with a spectro-imaging detector, say a Superconducting Tunnel Junction (STJ)-array.

Algorithm

Figure 16:
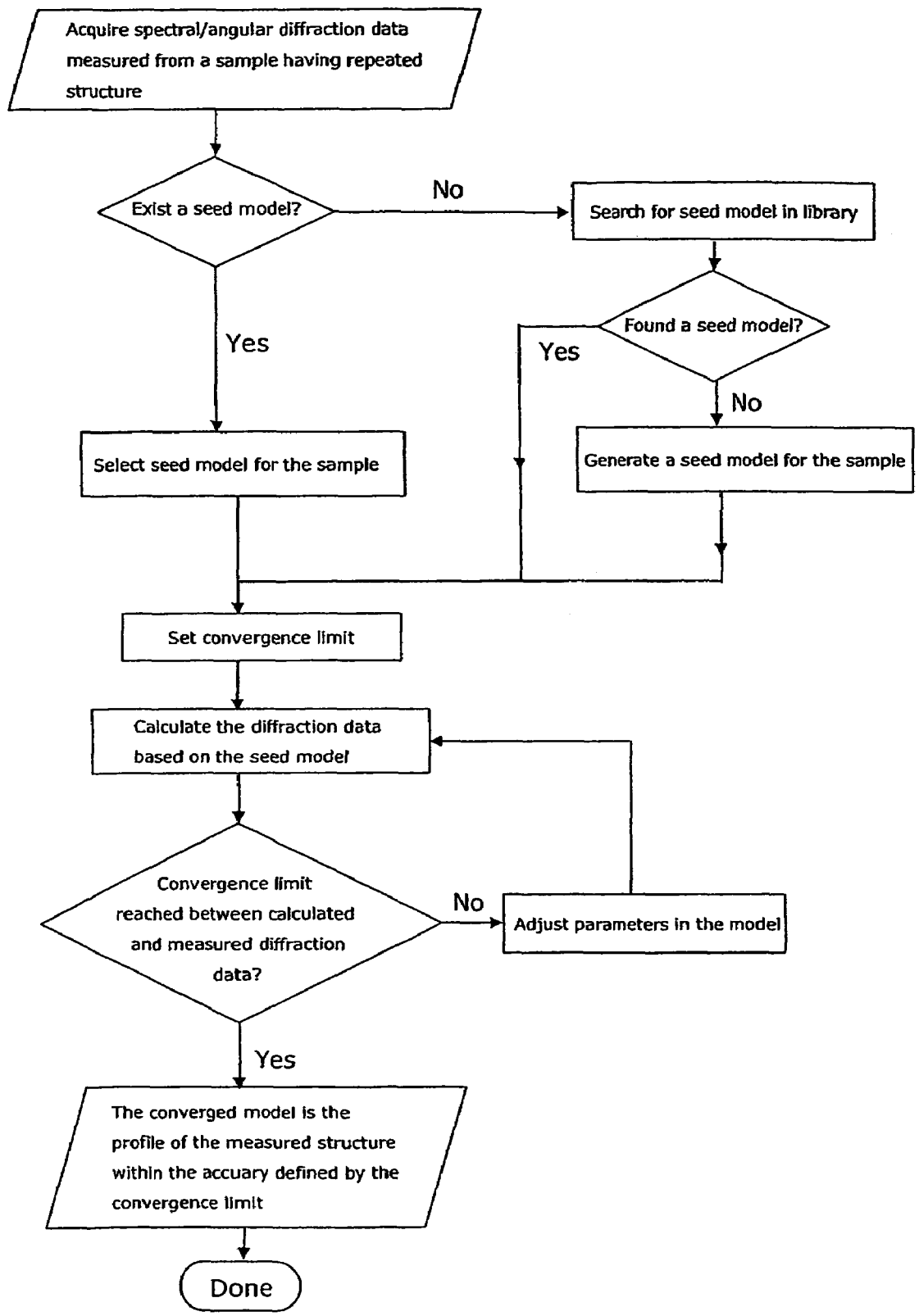
FIG. 16 is a flowchart of the algorithm determining the topography of samples having locally periodic microstructures.

The algorithm according to the invention is depicted in FIG. 16. Prior to the measurement the acquisition parameters for the measurement of microstructure are set. These parameters include adjustment of the distance between the collimating optics and the microstructure in order to collect the desired number of diffraction orders, selection of wavelength range, selection of illumination angle range to be measured, specifying the acceptable success limits for the measurement. After the measurements a computer algorithm is applied to determine the microstructure profile. Using the measured and normalized diffraction intensities for the detected-orders, spectral and/or angular range together with the optional seed profile the algorithm calculates the microstructure profile in the following way.

A database of seed profiles is accessed and searched for match using the measured data. The database consist of normalized diffraction intensities for series of profiles that are calculated using rigorous coupled wave analysis such as the Fourier modal method outlined in "Diffraction Theory of micro-relief Gratings, in H. P. Herzig (editor) Micro-optics, pp. 31-52, London: Taylor & Francis (1997)" and in "L. U:New formulation of the Fourier modal method for crossed surface-relief gratings, J. Opt. Soc. Am. A14 (1997)". An arbitrary profile of the repeated structure, sketched in FIG. 10, is approximated by discretization into multiple slabs consisting of $M_q$ by $N_q$ smaller building blocks. The building blocks (i,j,q) are characterized by the widths ($w_{qi}, w_{qj}$) and off-sets ($d_{qi}, d_{qj}$) in the lateral directions, height $h_q$ and index of refraction $n_{ijq}$.

The slabs are defined by the grating vectors a and b and the lateral periodicity is given by the lengths of the grating vectors: $|a|=\Lambda_a$ and $|b|=\Lambda_b$. In addition to the material and geometrical quantities of the microstructure the model calculation requires the electromagnetic parameters of the incoming light represented by plane waves: wavelength $\lambda$, linear polarization $\Phi$, and the direction of propagation given by the incident angle $\theta$ and the azimuth angle $\phi$. The Cartesian coordinate system is defined to have the x-axis along one of the periodic directions. See FIG. 1.

The searching technique used to select the seed model in the database is related to find the minimum norm difference between the measured diffraction efficiencies and the modeled efficiencies of the seed model. Herein the basic principle applying the least squares technique (squared $L_2$-norm) is demonstrated.

Each seed model is parameterized such that the geometrical shape of the profile is represented by a continuous profile function $z=\text{profile}(x,y,\alpha)$ with the adjusting parameters $\alpha=(\alpha_1,\alpha_2,\ldots,\alpha_u)$. A simple example of profile functions is the rectangular profile characterized by the parameters: profile height, profile widths and periodicity in the repeated directions.

The diffraction efficiency is calculated by applying the Fourier modal method on a model of the sample that may consist of multiple homogenous layers and layers with repeated structures. The profiles of these repeated structures are approximated by multiple slabs consisting of $M_q$ by $N_q$ smaller building blocks as illustrated in FIG. 10.

The database used to identify the optimum seed model in reconstruction of the profile consists of modeled diffraction efficiency data arrays for each type of profiles. Such an array represents tabulated diffraction efficiencies for suitable numbers of pre-defined values of wavelength $\lambda$, direction of incidence ($\theta,\phi$), diffraction orders (m,n), polarization angle, ..., and the adjusting parameters $\alpha=(\alpha_1,\alpha_2,\ldots,\alpha_u)$.

A seed model is selected as the model having minimum Chi squared between the measured diffraction efficiency data $(\theta,\phi,\lambda,m,n,\ldots,\sigma,\eta)_i$ and the modeled efficiency data, $$\min_{\text{seed model } j \in \text{database}} \left[ \sum_{i=1}^{N} \left( \frac{\eta_i - \eta^{\text{seed model}}(\Omega_i, \alpha_{\text{seed model } j})}{\sigma_i} \right)^2 \right], \quad (8)$$

$$\Omega_i = (\theta, \phi, \lambda, m, n, \ldots)_i$$

where $\sigma_1$ is the standard deviation of $\eta_1$.

In the case of a found seed model in the database a minimization least square fitting procedure is applied to adjust the seed profile until convergence between the calculated and measured diffraction efficiencies is reached.

The technique of reconstructing the profile based on measured efficiency data consists of minimization of the following normalized Chi squared expression $$\chi^2 = \frac{1}{N} \sum_{i=1}^{N} \left( \frac{\eta_i - \eta(\theta_i, \phi_i, \lambda_i, m_i, n_i, \ldots, \alpha)}{\sigma_i} \right)^2 \quad (9)$$

with respect to the adjusting parameters $\alpha=(\alpha_1,\alpha_2,\ldots,\alpha_u)$ of the profile model having u fitting parameters. N is the number of measured efficiency data points $(\theta,\phi,\lambda,m,n,\sigma,\ldots,\eta)_i$ obtained for various direction of incidence $(\theta,\phi)$, wavelengths $\lambda$, diffraction orders (m,n), polarization angles, etc.

How to Find $\alpha$

Let $\alpha_0$ be a good initial start vector for the profile parameters $\alpha$ and the diffraction efficiency $\eta$ be approximated to $1^{st}$ order by $$\eta(\Omega_i, \alpha) \approx \eta(\Omega_i, \alpha_0) + \frac{\partial \eta}{\partial \alpha}(\Omega_i, \alpha_0) \Delta \alpha$$

where $\Delta\alpha=\alpha-\alpha_0$ and $\Omega=(\theta,\phi,\lambda,m,n,\ldots)$. Thus, the Chi Squared expression in Eq. (9) can be approximated by $$\chi^2 \approx \frac{1}{N} \sum_{i=1}^{N} \left( \frac{\eta_i - \left\{ \eta(\Omega_i, \alpha_0) + \frac{\partial \eta}{\partial \alpha}(\Omega_i, \alpha_0) \Delta\alpha \right\}}{\sigma_i} \right)^2 \quad (10)$$

$$= \frac{1}{N} \left( \eta^{\text{measured}} - \eta_0 - \frac{\partial \eta_0}{\partial \alpha} \Delta\alpha \right)^2$$

where $$\eta^{\text{measured}} = \left( \frac{\eta_1}{\sigma_1}, \frac{\eta_2}{\sigma_2}, \ldots, \frac{\eta_N}{\sigma_N} \right),$$

$$\eta_0 = \left( \frac{\eta(\Omega_1, \alpha_0)}{\sigma_1}, \frac{\eta(\Omega_2, \alpha_0)}{\sigma_2}, \ldots, \frac{\eta(\Omega_N, \alpha_0)}{\sigma_N} \right) \text{ and}$$

$$\frac{\partial \eta_0}{\partial \alpha} = \left[ \frac{\partial \eta(\Omega_1, \alpha_0)}{\partial \alpha} \middle| \frac{\partial \eta(\Omega_2, \alpha_0)}{\partial \alpha} \middle| \ldots \middle| \frac{\partial \eta(\Omega_N, \alpha_0)}{\partial \alpha} \right].$$

Eq. 10 is well-known from linear algebra and is formally minimized for $$\frac{\partial \eta_0^T}{\partial \alpha}\frac{\partial \eta_0}{\partial \alpha}\Delta\alpha = \frac{\partial \eta_0^T}{\partial \alpha}(\eta^{measured} - \eta_0) \quad (11)$$

and leads to a new estimate of $\alpha = \alpha_0 + \Delta\alpha$. By repeated use of Eq. 11 the parameters $\alpha$ for the profile of the measured sample are returned.

If the calculated data is within the specified success criteria we are finished and the calculated profile is shown and saved to a media together with the diffraction efficiencies. A potential success criterion may be Chi Squared values of Eq. (10) within the statistical confidence limits as expected for the $\chi^2$-distribution for N independent points.

For speeding up the process of determining the parameter $\alpha$ an array of calculated diffraction efficiencies $\eta$ are generated or-retrieved from a table in order to approximate the efficiency $\eta$ and its derivatives $$\frac{\partial \eta}{\partial \alpha}$$

rapidly. The array consists of efficiency values tabulated for $\theta = \theta_0 + \delta\theta j$, $\phi = \phi_0 + \delta\phi k$, ..., $\alpha_1 = \alpha_{10} + \delta\alpha_1 l$, where j, k, ..., l are integers, i=1, ..., u, and $\delta\theta$, $\delta\phi$, ..., $\delta\alpha_1$ are carefully selected step lengths.

Any value of the diffraction efficiency within the domain of the array can be interpolated to e.g. following second order approximation in $\Delta\alpha$ around $\alpha_0$, $$\eta_{app}(\Omega,\alpha) \approx C + b\Delta\alpha + \Delta\alpha^T A \Delta\alpha$$

using neighboring values centered around $\alpha_0$ to determine the coefficients C, b and A. For known coefficients C, b and A the derivative $$\frac{\partial \eta}{\partial \alpha}$$

is easily obtained.

Chi Squared comparison between the measured efficiency data and the calculated efficiency in the array is used to select the initial guess of the profile parameters $\alpha$.

A Method of Process Control

The manufacturing of microstructures in the semiconductor and the telecommunication industries include processes of etching, film deposition, oxidation, lithographic techniques, and epitaxial techniques usually conducted in special environmental conditions.

Many of the processes are run from a recipe (pressure, duration, temperature etc.) and testing of the produced structures is undertaken after finalized processing. A consequence of the lack of control during the manufacturing process itself is an increased rejection level of microstructures resulting in a reduced yield.

A method of improving the process is applying in-situ or nearly real-time monitoring of the structures during the manufacturing process and thereby provide with continuously information on the actual features being developed and their dimensions such as depth, line width etc. This information can be used to adjust the process parameters, or as stop criterion, or for termination of the process if the specified tolerances are outside range.

The performance of pattern transfer process techniques such as lithography and reactive plasma etching is frequently challenged in order to make telecommunication and semiconductor microstructures where feature sizes, e.g. depth, sidewall slope and line width, are critical.

Processes used to produce layers or films include deposition, sputtering, evaporation, epitaxial growth and oxidation techniques are critical in the semiconductor and telecommunication industries where patterned structures are covered by a film. The critical issues are multifarious: 1) good step coverage of structures with steep sidewall in order to form a barrier to prevent diffusion of e.g. metal 2) planarization of deposited dielectrica is critical for structures having patterned conductors and dielectric in multiple layers. Lack of planarization induces interconnect problems.

The examples given above of formation of structures using the previously mentioned process techniques illustrate some of the process control applications of the invention described herein.

The concept of the method according to the present invention is to direct a light beam towards a single target or multiple targets on the substrate where a semi-periodic structure is being formed or already present through a process window, optical fiber or other means for access of the beam to the target(s). The transmitted or the backscattered diffracted light are continuously analyzed to provide nearly real time information about the trench depth, profile width, or any other geometrical parameter that might be valuable or critical. The collection of the diffracted light may be obtained using the same process and other windows, optical fibers or other means for the diffracted light to reach the detector of the invention.

It is important to stress that the structure being manufactured does not necessarily itself need to contain a periodic structure in order to perform the process control. Instead the substrate can have target areas outside the mother structure areas where periodic structures can be formed or already exist. These process control target areas contain periodic structures that have feature sizes, such as pitch, line width, notch size and depth, characteristic for the mother structure.

The developed structure can, by applying the method according to the present invention, be monitored for critical feature sizes in nearly real time and in-situ. This also includes uniformity control by measuring at multiple locations simultaneously or scanning.

TABLE 1

| Embodiment | Wavelength $\lambda$ | Polarization $\Phi$ | Propagation direction ($\theta$, $\phi$) | Diffraction order (m, n) | Profile | Seed model | Measurement mode |
| --- | --- | --- | --- | --- | --- | --- | --- |
| 1 | Range | Fixed | Fixed | Fixed | Symmetric | Yes | Transmitive |
| 2 | Range | Fixed | Fixed | Fixed | Symmetric | No | Transmitive |

TABLE 1-continued

| Embodiment | Wavelength λ | Polarization Φ | Propagation direction (θ, φ) | Diffraction order (m, n) | Profile | Seed model | Measurement mode |
|---|---|---|---|---|---|---|---|
| 3 | Fixed | Fixed | Range | Fixed | Symmetric | Yes | Transmitive |
| 4 | Fixed | Fixed | Range | Fixed | Symmetric | No | Transmitive |
| 5 | Range | Fixed | Fixed | Multiple | Symmetric | Yes | Transmitive |
| 6 | Range | Fixed | Fixed | Multiple | Symmetric | No | Transmitive |
| 7 | Fixed | Fixed | Range | Multiple | Symmetric | Yes | Transmitive |
| 8 | Fixed | Fixed | Range | Multiple | Symmetric | No | Transmitive |
| 9 | Range | Fixed | Fixed | Multiple | Asymmetric | Yes | Transmitive |
| 10 | Range | Fixed | Fixed | Multiple | Asymmetric | No | Transmitive |
| 11 | Fixed | Fixed | Range | Multiple | Asymmetric | Yes | Transmitive |
| 12 | Fixed | Fixed | Range | Multiple | Asymmetric | No | Transmitive |
| 13 | Range | Fixed | Range | Multiple | Symmetric | Yes | Transmitive |
| 14 | Range | Fixed | Range | Multiple | Symmetric | No | Transmitive |
| 15 | Range | Fixed | Range | Multiple | Asymmetric | Yes | Transmitive |
| 16 | Range | Fixed | Range | Multiple | Asymmetric | No | Transmitive |
| 17 | Range | Fixed | Fixed | Fixed | Symmetric | Yes | Reflective |
| 18 | Range | Fixed | Fixed | Fixed | Symmetric | No | Reflective |
| 19 | Fixed | Fixed | Range | Fixed | Symmetric | Yes | Reflective |
| 20 | Fixed | Fixed | Range | Fixed | Symmetric | No | Reflective |
| 21 | Range | Fixed | Fixed | Multiple | Symmetric | Yes | Reflective |
| 22 | Range | Fixed | Fixed | Multiple | Symmetric | No | Reflective |
| 23 | Fixed | Fixed | Range | Multiple | Symmetric | Yes | Reflective |
| 24 | Fixed | Fixed | Range | Multiple | Symmetric | No | Reflective |
| 25 | Range | Fixed | Fixed | Multiple | Asymmetric | Yes | Reflective |
| 26 | Range | Fixed | Fixed | Multiple | Asymmetric | No | Reflective |
| 27 | Fixed | Fixed | Range | Multiple | Asymmetric | Yes | Reflective |
| 28 | Fixed | Fixed | Range | Multiple | Asymmetric | No | Reflective |
| 29 | Range | Fixed | Range | Multiple | Symmetric | Yes | Reflective |
| 30 | Range | Fixed | Range | Multiple | Symmetric | No | Reflective |
| 31 | Range | Fixed | Range | Multiple | Asymmetric | Yes | Reflective |
| 32 | Range | Fixed | Range | Multiple | Asymmetric | No | Reflective |

The invention claimed is:

1. An apparatus for measuring geometrical profiles of periodic microstructures of a sample, the apparatus comprising a light source for emission of a light beam, polarizing means for polarizing the emitted light beam, focusing means for focusing the polarized light beam on the microstructures of the sample so as to provide, at a number of microstructures, a plurality of illumination angles simultaneously, a collection means for collecting light diffracted from the illuminated microstructures, the collection means being adapted to collect both the 0'th and higher diffraction orders, resolving means for resolving the collected light into diffraction data relating to illumination angles, polarization angles, diffraction orders, and illumination wavelengths, and a reconstruction algorithm for determining the geometrical profile of the illuminated microstructures, the reconstruction algorithm being adapted to perform the following steps:

comparing the resolved diffraction data with modeled diffraction data from a known geometrical profile, the comparison taking both the 0'th and higher diffraction orders into account, the known geometrical profile being selected from a database of pre-defined families of profiles, the selection being performed using minimum norm techniques, repeating adjusting the geometrical profile of the known selected geometrical profile until the modeled diffraction data matches the resolved diffraction data within predetermined tolerances.

2. An apparatus according to claim 1, wherein the light source comprises a broadband light source, such as Xenon, Deuterium, or halogen lamp.

3. An apparatus according to claim 1, wherein the focusing means comprises a lens system.

4. An apparatus according to claim 1, wherein the light source comprises a substantially monochromatic light source, such as a laser.

5. An apparatus according to claim 1, wherein the collection means comprises a lens system.

6. An apparatus according to claim 1, wherein the focusing means and the collection means each comprises a lens system.

7. An apparatus according to claim 6, wherein the lens systems of the focusing means and the collection means are the same lens system.

8. An apparatus according to claim 1, wherein the polarizing means comprises a beam splitter, the beam splitter generating a reference beam and an illumination beam.

9. An apparatus according to claim 1, wherein the resolving means comprises an imaging detection system.

10. An apparatus according to claim 9, wherein the imaging detection system comprises means for generating a plurality of light beams having different center wavelengths and propagating in different directions.

11. An apparatus according to claim 10, wherein the imaging detection system further comprises an array of light sensitive elements, the array of light sensitive elements being adapted to be illuminated by the generated plurality of light beams.

12. An apparatus according to claim 11, wherein the array of light sensitive elements forms part of a CCD array, an InGaAs array, a PbSe array, a PbS array, a Superconduction Tunnel Junction array, or any combination thereof.

13. An apparatus according to claim 9, wherein the imaging detection system comprises an array of color light sensitive elements, the color sensitivity being provided by a color mask positioned in front of the light sensitive elements.

14. An apparatus according to claim 13, wherein the array of light sensitive elements forms part of a CCD array, an InGaAs array, a PbSe array, a PbS array, a Superconduction Tunnel Junction array, or any combination thereof.

15. A non-destructive method for measuring geometrical profiles of periodic microstructures of a sample, the method comprising the steps of:
   providing a light source for emission of a light beam,
   polarizing the emitted light beam, and transmitting the polarized light beam to a refractive member,
   focusing the transmitted and polarized light beam on the microstructures of the sample using the refractive member so as to provide, at a number of microstructures, a plurality of illumination angles simultaneously,
   collecting light diffracted from the illuminated microstructures using a collection system, the collection system being adapted to collect both the 0'th and higher diffraction orders, and resolving the collected light into diffraction data relating to illumination angles, polarization angles, diffraction orders, and illumination wavelengths, and
   determining the geometrical profile of the illuminated microstructures using a reconstruction algorithm, the reconstruction algorithm comprising the steps of:
      comparing the resolved diffraction data with modeled diffraction data from a known geometrical profile, the comparison taking both the 0'th and higher diffraction orders into account, the known geometrical profile being selected from a database of predefined families of profiles, the selection being performed using minimum norm techniques,
      repeating adjusting the geometrical profile of the known selected geometrical profile until the modeled diffraction data matches the resolved diffraction data within predetermined tolerances.

16. Use of the method according to claim 15 for monitoring formation or alternation of periodic microstructures.

17. The use of the method according to claim 16, wherein the formation or alternation is monitored by monitoring respective formation or alternation of the microstructures.

18. The use of the method according to claim 16, wherein the formation or alternation is monitored by monitoring formation or alternation of an associated target structure.

19. The use of the method according to claim 16, wherein the periodic microstructures are formed or altered in a semiconductor, metallic, or dielectric material, or combination thereof.

20. The use of the method according to claim 19, wherein the periodic microstructures are formed or altered using an etching method, such as reactive plasma etching and wet etching.

21. The use of the method according to claim 19, wherein the periodic microstructures are formed using a lithographic process.

22. The use of the method according to claim 19, wherein the periodic microstructures are formed or altered using an epitaxial growth process.

23. The use of the method according to claim 19, wherein the periodic microstructures are formed or altered using a film deposition process.

24. The use of the method according to claim 19, wherein the periodic microstructures are formed or altered using an oxidation process.

25. An apparatus for measuring geometrical profiles of periodic microstructures of a sample, the apparatus comprising
   a light source for emission of a light beam,
   polarizing means for polarizing the emitted light beam,
   focusing means for focusing the polarized light beam on the microstructures of the sample so as to provide, at a number of microstructures, a plurality of illumination angles simultaneously,
   a collection means for collecting light diffracted from the illuminated microstructures, the collection means being adapted to collect both the 0'th and higher diffraction orders,
   resolving means for resolving the collected light into diffraction data relating to illumination angles, polarization angles, diffraction orders, and illumination wavelengths, and
   a reconstruction algorithm for determining the geometrical profile of the illuminated microstructures, the reconstruction algorithm being adapted to perform the following steps:
      comparing the resolved diffraction data with modeled diffraction data from a known parameterized geometrical profile, the comparison taking both the 0'th and higher diffraction orders into account, the known parameterized geometrical profile being selected by variation of the geometrical profile parameters, the selection of the parameters being performed using minimum norm techniques,
      repeating adjusting the geometrical profile of the known selected geometrical profile until the modeled diffraction data matches the resolved diffraction data within predetermined tolerances.

26. An apparatus according to claim 25, wherein the light source comprises a broadband light source, such as Xenon, Deuterium, or halogen lamp.

27. An apparatus according to claim 25, wherein the focusing means comprises a lens system.

28. An apparatus according to claim 25, wherein the light source comprises a substantially monochromatic light source, such as a laser.

29. An apparatus according to claim 25, wherein the collection means comprises a lens system.

30. An apparatus according to claim 25, wherein the focusing means and the collection means each comprises a lens system.

31. An apparatus according to claim 30, wherein the lens systems of the focusing means and the collection means are the same lens system.

32. An apparatus according to claim 25, wherein the polarizing means comprises a beam splitter, the beam splitter generating a reference beam and an illumination beam.

33. An apparatus according to claim 25, wherein the resolving means comprises an imaging detection system.

34. An apparatus according to claim 33, wherein the imaging detection system comprises means for generating a plurality of light beams having different center wavelengths and propagating in different directions.

35. An apparatus according to claim 34, wherein the imaging detection system further comprises an array of light sensitive elements, the array of light sensitive elements being adapted to be illuminated by the generated plurality of light beams.

36. An apparatus according to claim 35, wherein the array of light sensitive elements forms part of a COD array, an InGaAs array, a PbSe array, a PbS array, a Superconduction Tunnel Junction array, or any combination thereof.

37. An apparatus according to claim 34, wherein the imaging detection system comprises an array of color light sensitive elements, the color sensitivity being provided by a color mask positioned in front of the light sensitive elements.

38. An apparatus according to claim 37, wherein the array of light sensitive elements forms part of a CCD array, an InGaAs array, a PbSe array, a PbS array, a Superconduction Tunnel Junction array, or any combination thereof.

39. A non-destructive method for measuring geometrical profiles of periodic microstructures of a sample, the method comprising the steps of:

providing a light source for emission of a light beam, polarizing the emitted light beam, and transmitting the polarized light beam to a refractive member, focusing the transmitted and polarized light beam on the microstructures of the sample using the refractive member so as to provide, at a number of microstructures, a plurality of illumination angles simultaneously, collecting light diffracted from the illuminated microstructures using a collection system, the collection system being adapted to collect both the 0'th and higher diffraction orders, and resolving the collected light into diffraction data relating to illumination angles, polarization angles, diffraction orders, and illumination wavelengths, and determining the geometrical profile of the illuminated microstructures using a reconstruction algorithm, the reconstruction algorithm comprising the steps of:

comparing the resolved diffraction data with modeled diffraction data from a known parameterized geometrical profile, the comparison taking both the 0'th and higher diffraction orders into account, the known parameterized geometrical profile being selected by variation of the geometrical profile parameters, the selection of the parameters being performed using minimum norm techniques, repeating adjusting the geometrical profile of the known selected geometrical profile until the modeled diffraction data matches the resolved diffraction data within predetermined tolerances.

40. Use of the method according to claim 39 for monitoring formation or alternation of periodic microstructures.

41. The use of the method according to claim 40, wherein the formation or alternation is monitored by monitoring respective formation or alternation of the microstructures.

42. The use of the method according to claim 40, wherein the formation or alternation is monitored by monitoring formation or alternation of an associated target structure.

43. The use of the method according to claim 40, wherein the periodic microstructures are formed or altered in a semiconductor, metallic, or dielectric material, or combination thereof.

44. The use of the method according to claim 43, wherein the periodic microstructures are formed or altered using an etching method, such as reactive plasma etching and wet etching.

45. The use of the method according to claim 43, wherein the periodic microstructures are formed using a lithographic process.

46. The use of the method according to claim 43, wherein the periodic microstructures are formed or altered using an epitaxial growth process.

47. The use of the method according to claim 43, wherein the periodic microstructures are formed or altered using a film deposition process.

48. The use of the method according to claim 43, wherein the periodic microstructures are formed or altered using an oxidation process.

* * * * *